(12) United States Patent
Hallgrimsson et al.

(10) Patent No.: US 7,219,906 B2
(45) Date of Patent: May 22, 2007

(54) HEIGHT-ADJUSTABLE CORDLESS BRAKE

(75) Inventors: Bjarki Hallgrimsson, Ottawa (CA); Jeff Richter, Kanata (CA)

(73) Assignee: Random Products In Trust, St. Michael (BB)

( * ) Notice: Subject to any disclaimer, the term of this patent is extended or adjusted under 35 U.S.C. 154(b) by 346 days.

(21) Appl. No.: 10/887,351

(22) Filed: Jul. 9, 2004

(65) Prior Publication Data

US 2004/0245737 A1    Dec. 9, 2004

Related U.S. Application Data

(60) Continuation-in-part of application No. 10/692,092, filed on Oct. 23, 2003, which is a division of application No. 09/908,102, filed on Jul. 18, 2001, now Pat. No. 6,659,478.

(30) Foreign Application Priority Data

Sep. 12, 2000    (CA)    .................................... 2318028

(51) Int. Cl.
    *B62M 1/00*    (2006.01)
(52) U.S. Cl. ....................... 280/87.041; 188/21; 135/67
(58) Field of Classification Search ................. 280/1.5, 280/43, 47.34, 87.041; 188/19, 21, 29, 2 F; 135/67, 85
See application file for complete search history.

(56) References Cited

U.S. PATENT DOCUMENTS

| | | | | |
|---|---|---|---|---|
| 4,029,311 A | * | 6/1977 | Chanslor et al. ............. | 482/68 |
| 5,279,180 A | | 1/1994 | Henriksson ................. | 74/502.2 |
| 5,451,193 A | | 9/1995 | Pickard ....................... | 482/68 |
| 5,603,517 A | * | 2/1997 | Lorman ...................... | 280/5.2 |
| 5,605,345 A | | 2/1997 | Erfurth et al. ............. | 280/250.1 |
| 5,772,234 A | * | 6/1998 | Luo ............................ | 280/642 |
| 6,283,484 B1 | * | 9/2001 | Malmstrom ............. | 280/87.041 |
| 6,651,994 B2 | * | 11/2003 | Hallgrimsson et al. | 280/87.041 |
| 6,659,478 B2 | * | 12/2003 | Hallgrimsson et al. | .. 280/47.36 |
| 7,052,030 B2 | * | 5/2006 | Serhan ..................... | 280/304.1 |
| 7,066,484 B2 | * | 6/2006 | Willis et al. ............... | 280/642 |
| 2002/0050697 A1 | * | 5/2002 | Hallgrimsson et al. | 280/87.051 |
| 2004/0118640 A1 | * | 6/2004 | Hallgrimsson ............ | 188/2 F |
| 2004/0245737 A1 | * | 12/2004 | Hallgrimsson et al. | .. 280/87.01 |
| 2005/0067804 A1 | * | 3/2005 | Tolfsen ................... | 280/87.041 |

* cited by examiner

*Primary Examiner*—J. Allen Shriver
(74) *Attorney, Agent, or Firm*—Teitelbaum & MacLean; Neil Teitelbaum; Doug MacLean

(57) ABSTRACT

The present invention relates to a cordless braking system for a mobility-aiding device, such as a wheeled walker (a rollator) or a transport chair. The cordless braking system includes a brake actuating linkage, disposed inside the leg and handlebar members of the mobility-aiding device, which extends during height adjustment of the handlebars. The brake-actuating linkage and the leg/handlebar of the mobility-aiding device are designed to enable a locking pin or bolt to extend all the way therethrough to ensure that all of the height-adjustable members are secured together during use.

18 Claims, 17 Drawing Sheets

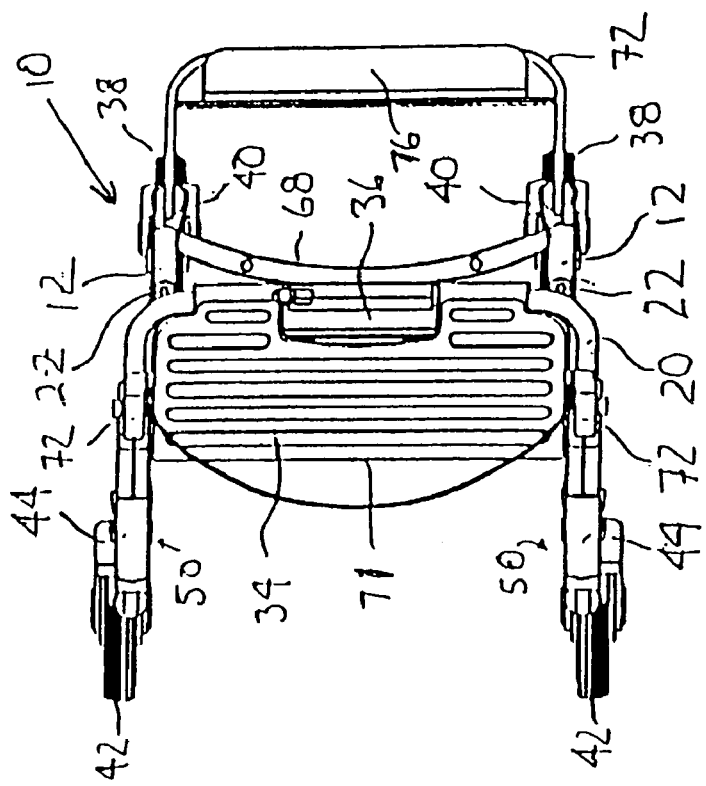
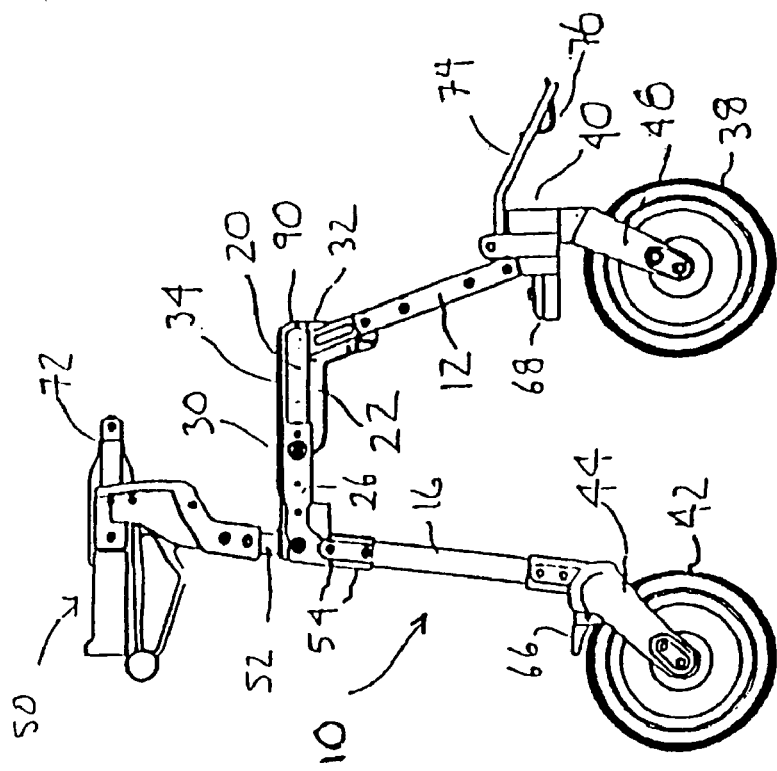

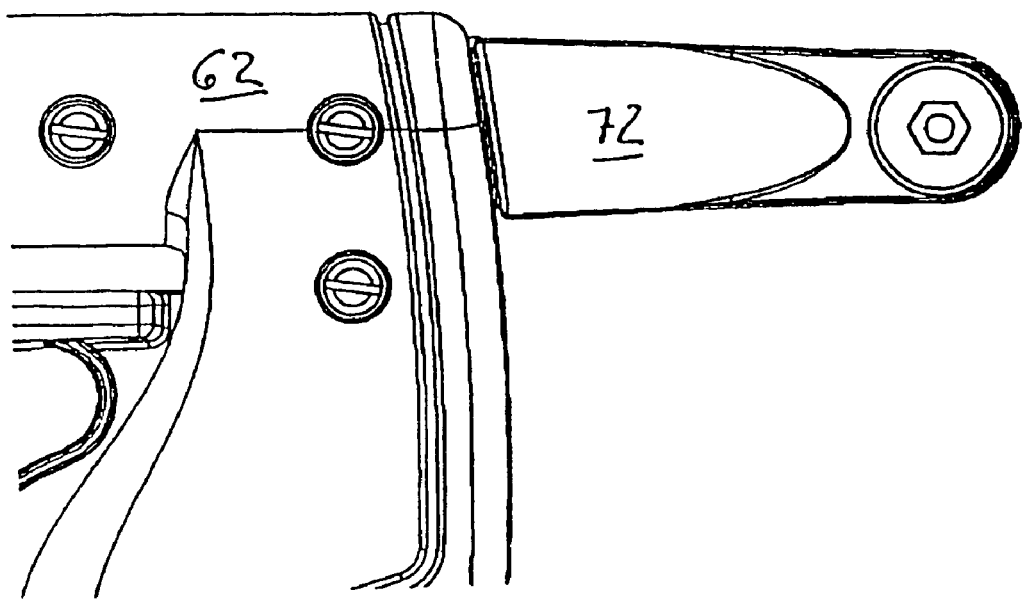
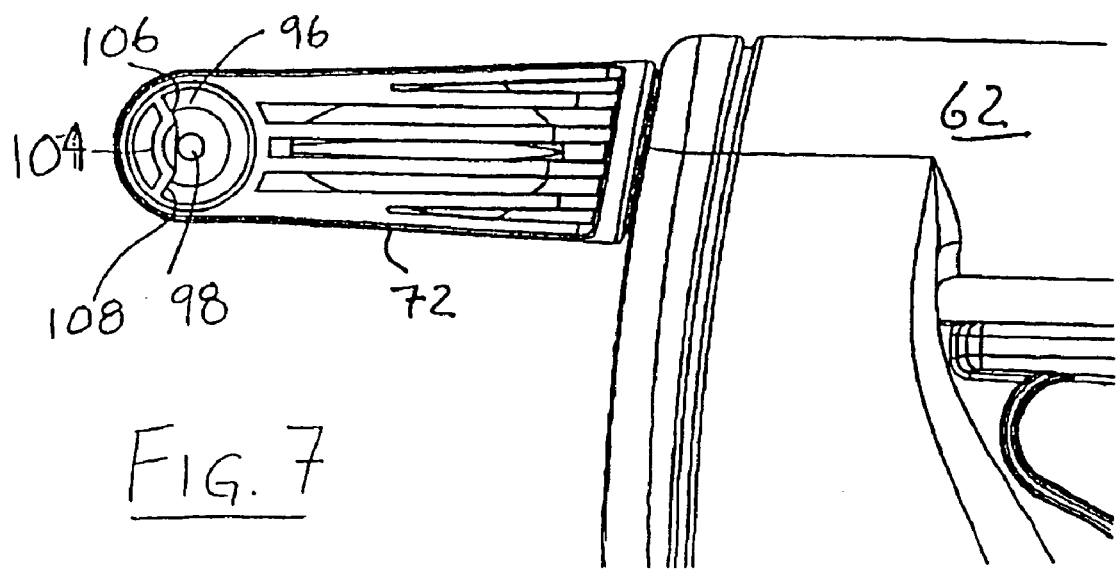

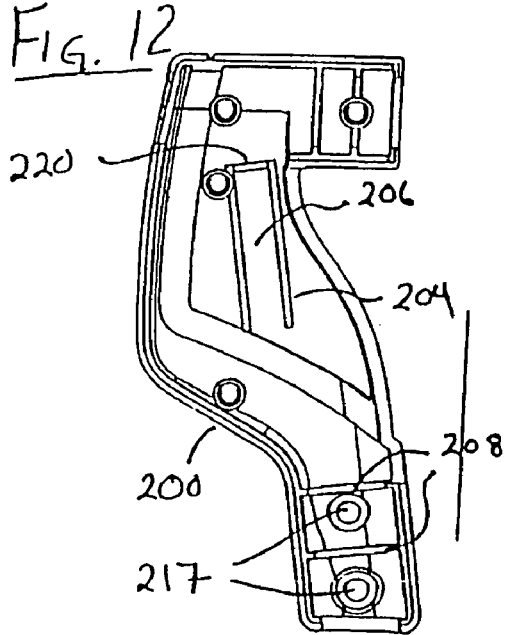
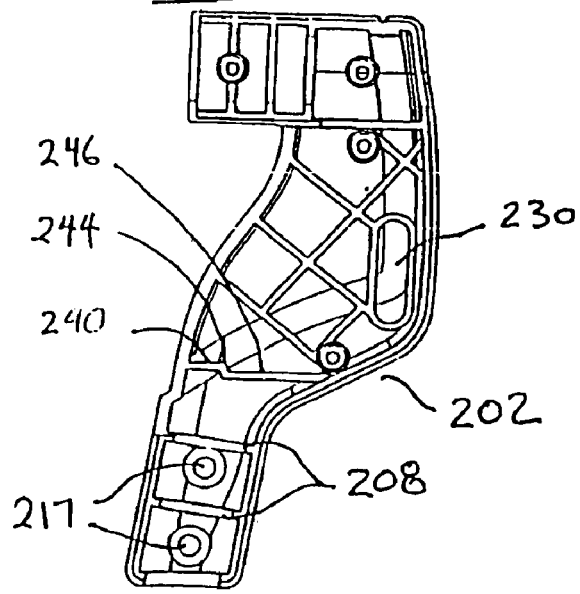
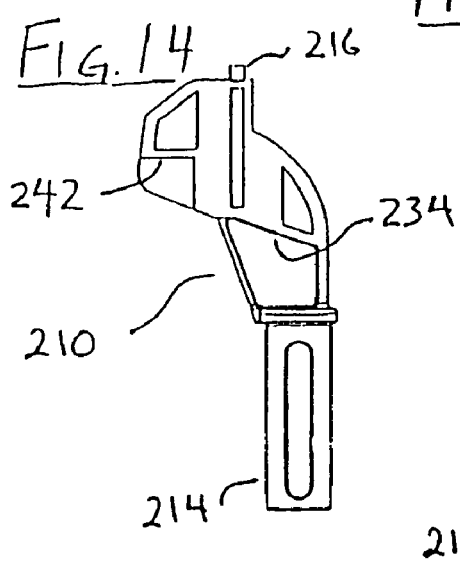
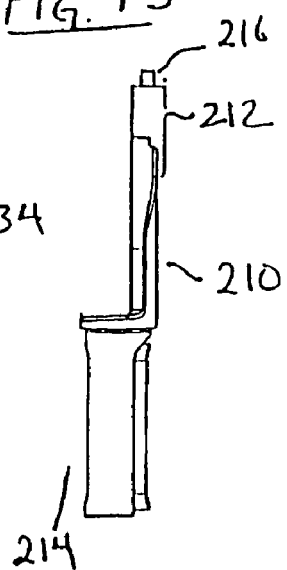
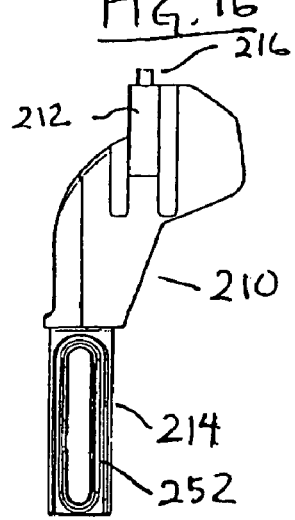

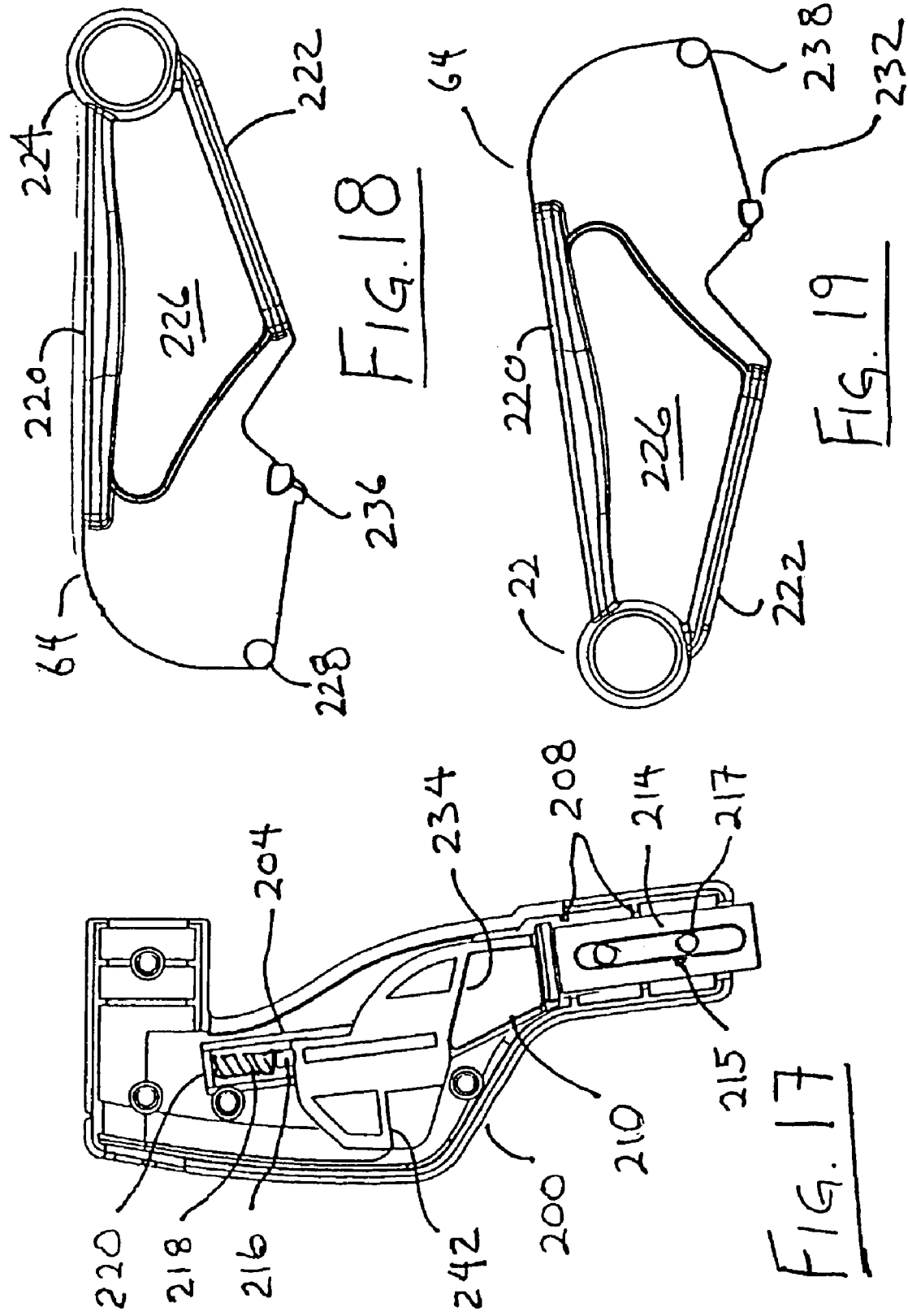

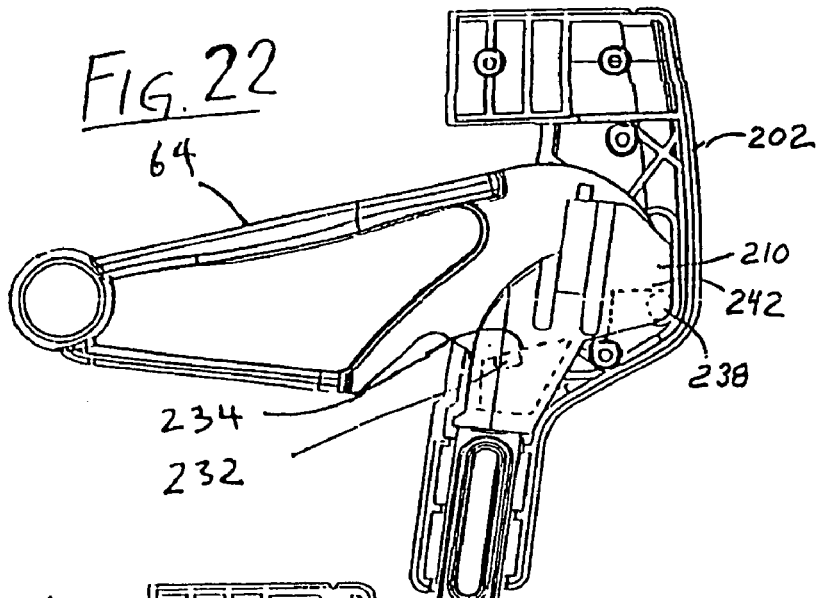
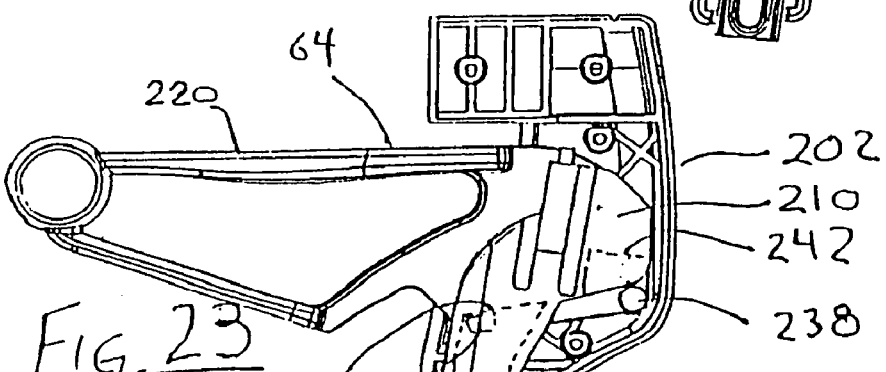
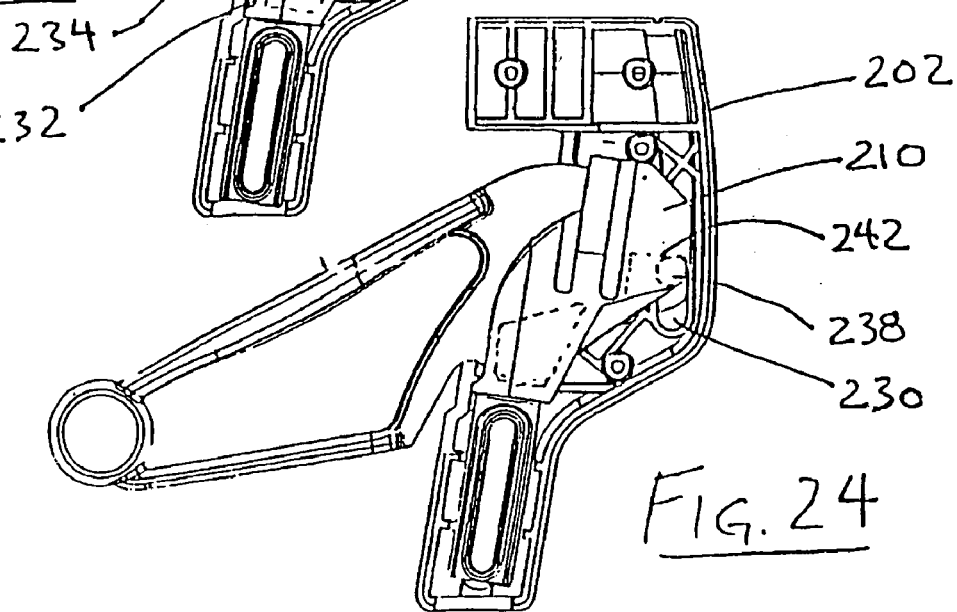

HEIGHT-ADJUSTABLE CORDLESS BRAKE

CROSS REFERENCE TO RELATED PRIOR ART

The present application is a continuation-in-part of U.S. patent application Ser. No. 10/692,092 filed Oct. 23, 2003, which is a divisional of U.S. patent application Ser. No. 09/908,102 filed Jul. 18, 2001, which issued as U.S. Pat. No. 6,659,478 on Dec. 9, 2003, which claims priority from Canadian Patent Application No. 2318028 filed Sep. 12, 2000, all of the United States Patent applications are incorporated herein by reference.

BACKGROUND OF THE INVENTION

The present invention relates to a wheeled walker, which can be used as a transport chair, and in particular to a novel braking system for wheeled apparatus.

Many persons, by reason of age or disability have difficulty in walking without a walking aid. Wheeled walkers or rollators are widely used by many such persons to assist in mobility. A wheeled walker typically has a frame mounted on four wheels and a pair of rearwardly extending handlebars, which the user can grip for support while walking. The user positions himself between the handlebars behind the walker, and pushes the walker forward. The wheels permit the user to roll the walker smoothly over the ground, thereby avoiding the laborious action of picking up and moving a non-wheeled walker in step-by-step fashion. The handle bars can be fitted with brake levers that when squeezed by the user, actuate some form of wheel braking mechanism.

Wheeled walkers are routinely equipped with a seating surface that permits the user to rest in the sitting position. The seating surface is usually positioned transversely between the handlebars within the wheelbase of the walker to offer a stable platform for sitting. In order to use the seating surface, the user must turn around and sit down in the rearward facing direction, opposite to the normal direction of travel, with his feet resting on the ground. The braking mechanism can be fitted with a locking mechanism to maintain braking engagement with the wheels to prevent the walker from rolling while the user is sitting.

While the provision of a seat to permit the user to rest is a useful feature, it often occurs that the user is too tired to continue walking and requires the assistance of a caregiver to continue travel. Conventional wheeled walkers are not adapted to support a seated user and be pushed by a caregiver. In particular, because the user is seated in a rearward facing position between the handlebars, there is very little space between the user and the caregiver, making it difficult for the caregiver to take walking steps without interfering with the feet of the user. Moreover, there is no dedicated means on conventional walkers to support the feet of the user while in the sitting position with the result that the feet are usually dragged across the ground or propped up on a frame member in an unnatural position.

There have been a number of attempts to provide a wheeled apparatus that is useful as a self-propelled walker and also as a caregiver propelled transport chair.

U.S. Pat. No. 5,451,193 discloses a combined wheelchair and walker. In the normal walking position, the seating surface is pivoted up rearwardly toward the seat back to provide space between the handlebars for the user to walk. The user walks in a forward direction pulling the walker behind him. When the user wishes to sit, the seating surface can be flipped down. There is no provision to permit the walker to be pushed by a caregiver. Indeed, the patent discloses that a third party must pull the seated user backwards by pulling on the seat back.

U.S. Pat. No. 5,451,193 discloses a combination wheelchair and walker. While the user or the caregiver can push the apparatus from behind as a conventional walker or transport chair, in order to assume the seated position, the user must walk around to the front of the apparatus, which manoeuvre can be difficult for a physically challenged person.

U.S. Pat. No. 5,605,345 discloses a wheeled apparatus for use both as a walker and a wheelchair. The design has rearward facing handlebars to permit the apparatus to be used as a wheeled walker. The design also has a bi-directional seating arrangement. When the seat is placed in the rearward facing position, it permits the person using the device as a walker to rest in a seated position by turning around and sitting down in the rearward facing direction with his feet resting on the ground. When the seat is placed in the forward facing position, the apparatus can be used as a conventional wheelchair. The wheelchair design is conventional in that it has large rear wheels with hand-rings that permit the wheelchair to be propelled by the occupant or rearward facing handles to permit the wheelchair to be pushed by a caregiver.

While the design disclosed in U.S. Pat. No. 5,605,345 offers significant advantage, it is not well adapted for use as a walker. Because it is based on a conventional wheelchair design, it is heavy and bulky, making it difficult to manoeuvre in confined locations. Furthermore, the bi-directional seating arrangement uses a frame mounted link arrangement, which cannot be practicably adapted to a light walker design. Because the seat back is pivoted to the seat base, the vertical rise of the seat back is limited and accordingly offers only lower back support. Furthermore, when positioned in the walker mode, the seat back obscures the user's view of the ground directly in front of the walker.

Conventional walkers have been equipped with handle bar mounted braking system actuators that permit the user to manually apply braking force when walking or to lock the brakes to permit the user to safely assume a seated position. For example, one such system is disclosed in U.S. Pat. No. 5,279,180, and relates to a cable braking system. The actuating mechanism uses a connecting lever to pull the cable when the brake lever is raised to a braking position or depressed to a locked position.

Thus, there remains a need for a walking aid that offers all of the functionality of a conventional wheeled walker and can be readily converted for use as a transport chair.

Cable type braking systems are commonly used on walkers, which have height adjustable handlebars. In such a case, the flexible cable accommodates the variable length between the brake handle actuator and the wheel mounted braking element. However, cable type braking mechanisms have a number of deficiencies. In particular, the cables require rather precise and periodic adjustment to maintain effective braking action. Moreover, because the cables are routed from the brake handle actuator to the wheels outside of the frame and require some slack to accommodate height adjustability, the resulting loop or bight in the cable is prone to catching or snagging on other objects, a deficiency which is particularly problematic in the case of a folding style walker that is transported in the trunk of a car.

A simple solution for eliminating the brake cable is to provide a solid rod linkage between the brake-handle actuator and the braking element that extends down through the two telescoping parts of the height-adjustable handle bar. Unfortunately, the solid rod linkage prevents a pin, bolt or screw from passing through both the telescoping parts of the height-adjustable handlebars, which would normally provide a secure, but adjustable means for locking the telescoping parts together. Since safety is the ultimate priority for these types of devices, it is important that the height adjustable handlebars are securely reconnected after adjustment. One solution to this problem is disclosed in U.S. Pat. No. 6,283,484 issued Sep. 4, 2001 in the name of Malmström, which provides an adjustable brake rod inside the telescoping handlebars. Unfortunately, the Malmström device relies on a single friction screw, which extends through the outer telescoping parts of the handle bars into frictional engagement with the inner telescoping brake rods, to hold the two telescoping parts of the handlebar and the two telescoping parts of the brake rod together. This system relies heavily on the strength of the user, and on the durability of the frictionally engaged materials. Frequent tightening and loosening by elderly or otherwise disabled users make this type of system susceptible to accidental slippage, and therefore unacceptably dangerous.

An object of the present invention is to overcome the shortcomings of the prior art cable and cordless based systems by providing a cordless brake actuating system for a height adjustable handlebar that enables a locking screw, pin or bolt to extend through both parts thereof.

SUMMARY OF THE INVENTION

Accordingly, the present invention relates to a height-adjustable, manually-actuated brake device for use with a wheel mounted on a height-adjustable frame, which includes a lower telescopic member, an upper telescopic member, and a locking pin for extending through both the upper and lower telescopic members, comprising:
- a brake mounted on the lower telescopic member;
- a manually-engageable brake actuator for actuating the brake;
- an upper leg extending from the brake actuator through the upper telescopic member, the upper leg including a gap for receiving the locking pin, which extends therethrough;
- a lower rod adjustably connected to the upper leg and extending through the lower telescopic member, the lower rod including a slot for receiving the locking pin, which extends therethrough; and
- an adjustable connector for locking the upper leg and lower rod together at any one of a plurality of positions.

Another feature of the present invention relates to a mobility aiding device comprising:
- a frame including front and rear support members, the rear support members having upper and lower telescoping members;
- a locking pin for extending through the upper and lower telescoping members for locking the relative position thereof;
- front wheels mounted on the front support members;
- rear wheels mounted on the rear support members;
- a moveable brake mounted on the frame for hindering the rotation of one of the front or rear wheels;
- a manually-engageable brake actuator for actuating the brake;
- an upper leg extending from the brake actuator through the upper telescopic member, the upper leg including a gap for receiving the locking pin, which extends therethrough;
- a lower rod adjustably connected to the upper leg and extending through the lower telescopic member, the lower rod including a slot for receiving the locking pin, which extends therethrough; and
- an adjustable connector for locking the upper leg and lower rod together at any one of a plurality of positions.

BRIEF DESCRIPTION OF THE DRAWINGS

FIG. 4 is a right side view of the walker/transport chair of the present invention with the back rest in the transport chair position;

FIG. 5 is a plan view of the walker/transport chair of the present invention with the back rest in the transport chair position;

FIG. 6 is a right side view of the back rest extension arm;

FIG. 7 is a left side view the back rest extension arm;

FIG. 12 is a side view of the inside of the right brake housing half;

FIG. 13 is a side view of the inside of the left brake housing half;

FIG. 14 is a left side view of the brake actuator slide;

FIG. 15 is a rear view of the brake actuator slide;

FIG. 16 is a right side view of the brake actuator slide;

FIG. 17 is a side view of the inside of the right brake housing half showing the position of the brake actuator slide;

FIG. 18 is a left side view of the brake lever;

FIG. 19 is a right side view of the brake lever;

FIG. 22 is a side view of the inside of the left brake housing half showing the brake lever and the brake actuator slide in the neutral position;

FIG. 23 is a side view of the inside of the left brake housing half showing the brake lever and the brake actuator slide in the raised brake actuating position;

FIG. 24 is a side view of the inside of the left brake housing half showing the brake lever in the depressed brake locking position;

DESCRIPTION OF THE PREFERRED EMBODIMENT

Figure 1:
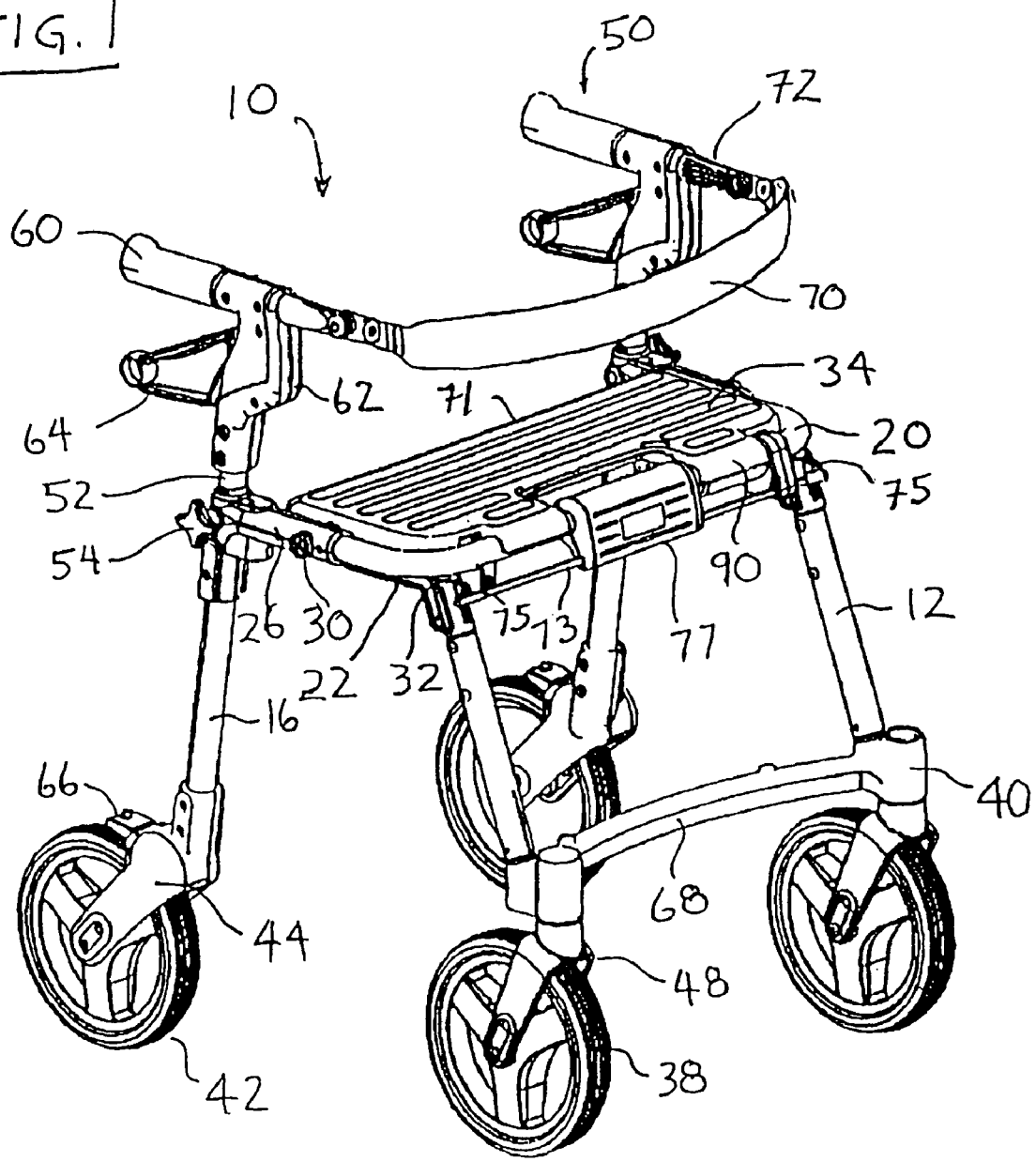
FIG. 1 is a front right perspective view of the walker/transport chair of the present invention with the back rest in the walker position.
Figure 3:
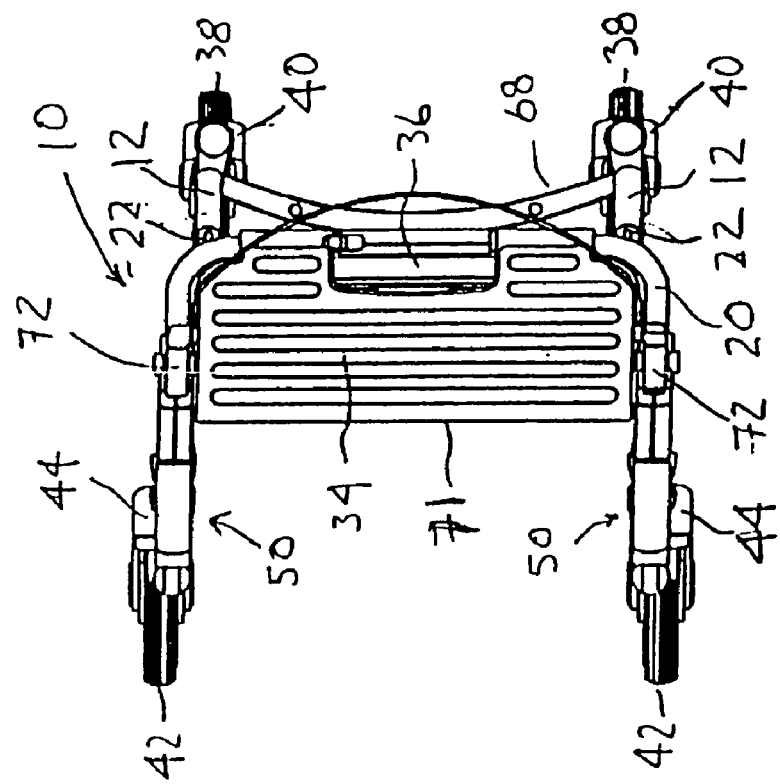
FIG. 3 is a plan view of the walker/transport chair of the present invention with the back rest in the walker position.
Figure 2:
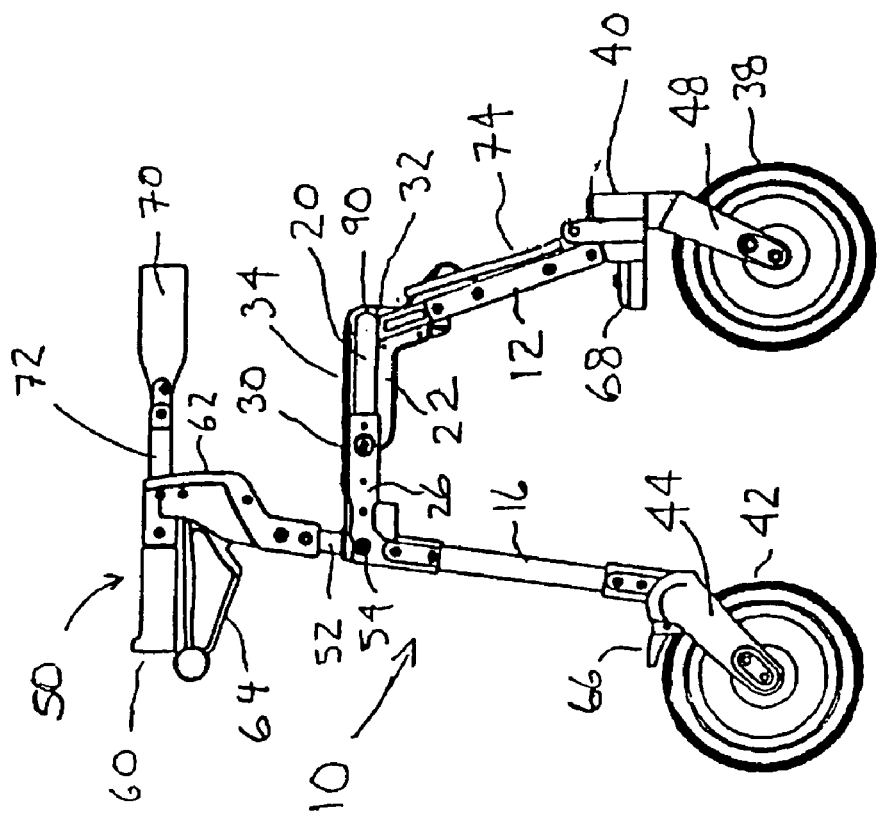
FIG. 2 is a right side view of the walker/transport chair of the present invention with the back rest in the walker position.

Referring to FIGS. 1 to 3, there is shown a perspective view of a rollator or walker/transport chair 10 in the walker configuration. Walker/transport chair 10 has a pair of forward leg members 12, a pair or rearward leg members 16, and a U-shaped transverse seat support member 20. Front leg members 12 are fixedly secured at their upper ends to front leg brackets 22, and rear leg members 16 are fixedly attached at their upper ends to rear leg brackets 26. Front leg brackets 22 are pivotally attached to rear leg brackets 26 at pivot pins 30. In the open or operative position shown in FIGS. 1 to 3, abutment surfaces 32 at the upper ends of front leg brackets 22 engage the forward lower edge of seat support member 20, when forward leg members 12 are in the open and weight bearing position. Front leg brackets 22 permit the front leg members 12 to be folded toward rear leg members 16 in order to collapse walker/transport chair 10 into a more compact configuration, e.g. for placement in the trunk of a car.

Walker/transport chair 10 is locked in the open position by means of lock rod 73, which engages projections 75 on front leg brackets 22. Handle 77 is rotatably mounted about transverse seat support member 20 for moving lock rod 73 out of engagement with projections 75. Handle opening 36 is provided in seating surface 34 to provide easy access to handle 77.

Seating surface 34 is horizontally supported at its forward edge 90 by transverse seat support member 20 and provides a stable seating platform. Seating surface 34 is pivotally attached to transverse seat support member 20 such that it can be flipped to a vertical position by pulling up on rear edge 71. This position is particularly useful when the user wishes to move as far forward as possible, for example when reaching ahead of the walker/transport chair 10 to remove objects from a cupboard.

Front leg members 12 are stabilized by crossbar member 68, which extends horizontally between front leg members 12 and is fixedly secured to the bottom ends of front leg members 12 at end fittings 40. Front wheels 38 are mounted on front fork assemblies having a vertical axle shaft carried in a bearing assembly (not shown) in each end fitting 46 for rotation about the vertical axis to permit front wheels 38 to caster for ease of steering walker/transport chair 10.

Rear wheels 42 are carried at the lower ends of rear leg members 16 on rear fork assemblies 44. Rear fork assemblies 44 are fixedly connected to the lower ends of rear leg members 16.

Push handle assemblies 50 are fixedly attached to the upper ends of telescopic tubes 52 which are slidably received in rear leg members 16. The height of push handle assemblies 50 can be adjusted by extending or retracting telescopic tubes 52 in rear leg members 16. Telescopic tubes 52 have a series of through holes at uniform spacing along their length through which thumb screws (or other locking pin or bolt) 54 can be selectively inserted to fix push handle assemblies 50 at the desired height.

Push handle assemblies 50 comprise handgrips 60, handle housings 62 and brake levers 64. Brake levers 64 are operatively connected to brake shoes 66 by length-adjustable rod assemblies housed within the telescopic tubes 52 and the rear leg members 16. Movement of the brake levers 64 will cause the brake shoes 66 to move into braking engagement with the tread of rear wheels 42 thereby arresting rolling motion.

When walker/transport chair 10 is in the walker configuration as shown in FIGS. 1 to 3, the user positions himself behind walker/transport chair 10, and between push handle assemblies 50 facing the forward direction. In order to function as an effective walker, it is desirable that the geometry of the walker be such that the user can position himself far enough forward that his center of gravity is vertically aligned over handgrips 60. This will permit the user to support a substantial portion of his weight on handgrips 60 when desirable to reduce the weight on the feet.

In order to ensure stability of the rollator 10 when a substantial vertical load is placed on handgrips 60, the handgrips must be positioned forward of the point of ground contact of rear wheels 42. Moreover, in order to facilitate walking, there must be sufficient room in front of the user to permit him to extend his feet forward in a natural walking gait without interfering with the rollator structure, and in particular with the seating surface. Accordingly, the position of seating surface 34 is biased to the front of walker/transport chair 10 such that its rear edge 71 is forward of handgrips 60. In addition, seating surface 34 can be flipped to a vertical position about transverse seat support member 20 as described above. This will provide the user with additional space to move forward between push handle assemblies 50 if desired.

When the user wishes to rest, he simply turns around between push handle assemblies 50, using handgrips 60 for support if required, and sits down on seating surface 34, with his feet on the ground. Backrest 70 is provided to support the user's back while seated on walker/transport by chair 10. Backrest 70 is attached to extension arms 72 which are fixed at their rearward ends to push handle assemblies 50.

Figure 8:
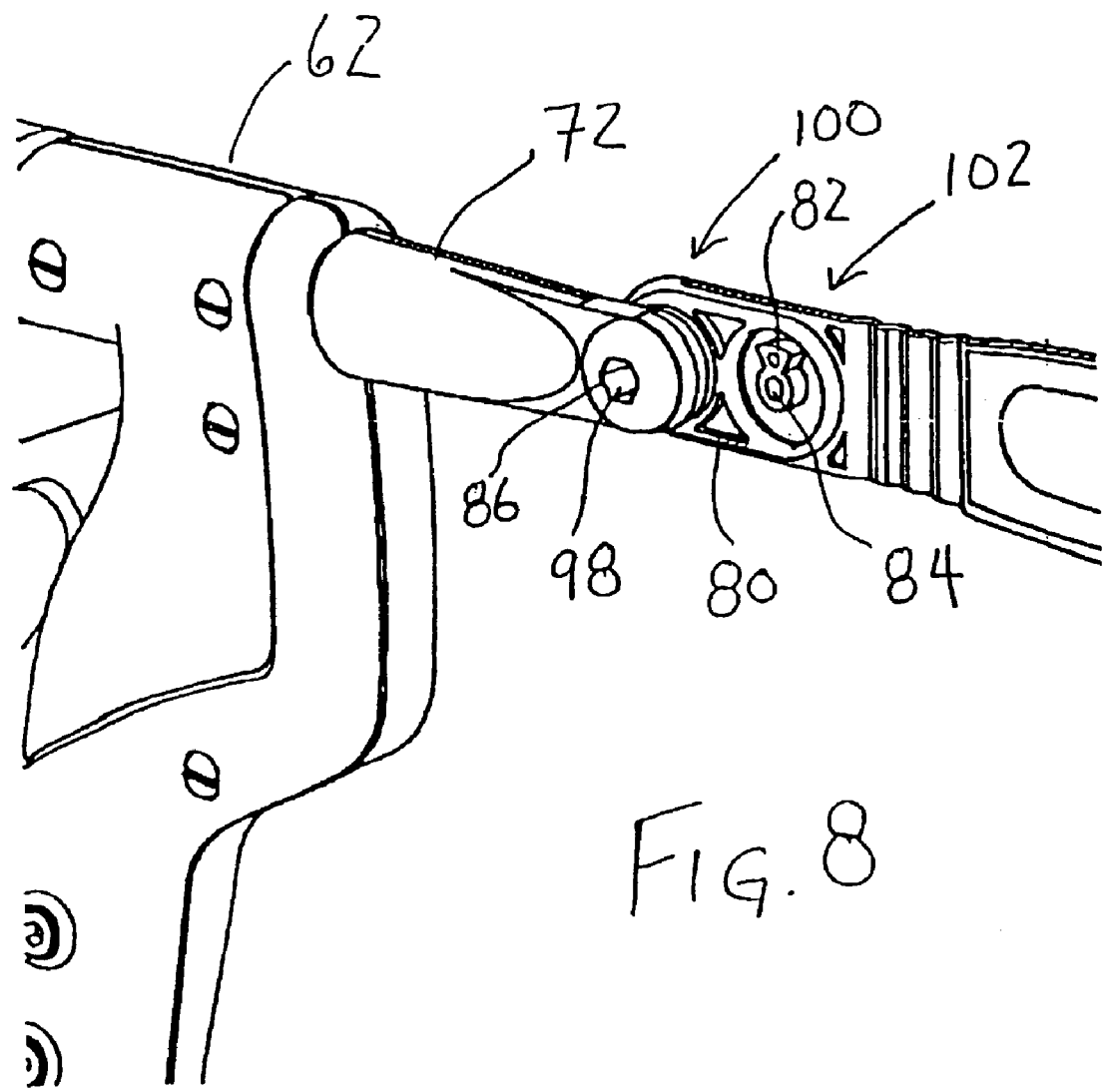
FIG. 8 is a perspective view showing the manner in which the backrest is connected to the extension arms.

FIGS. 6, 7 and 8 show the details of extension arms 72 and the manner in which backrest 70 is attached to extension arms 72. The extension arms 72 each have an inward facing part-annular recess 96 with a central cylindrical bore 98 formed therethrough. The backrest 70 has formed therein two mounting points 100 and 102 for attachment to extension arm 72. Mounting point 100 can be used as the point of attachment for a larger user whereas mounting point 102 effectively shortens the length of backrest 72 for a smaller user. The configuration of mounting points 100 and 102 is identical and will be described with reference to point 102, which is visible in FIG. 8.

The backrest 70 is formed of a flexible plastic material and at each end has a connection piece 80. The backrest 70 and the connection piece 80 can be unitarily molded of a suitable plastic material that has sufficient flexibility in the central back-supporting area to conform to and support a user's back and sufficient mechanical strength to function as a connection piece. In the alternative, the backrest 70 and the connection piece 80 can be separate components joined together. Moreover, the backrest 70 can be formed of a rigid material such as aluminum if a non-flexible back strap type backrest is desired. The connection piece 80 has an outwardly projecting key type lug 82 and a central bore 84 formed therethrough. Part-annular recess 96 in extension arm 72 is sized to fit over and closely receive key type lug 82 on backrest 70 with the cylindrical bores 84 and 98 axially aligned. A suitable bolt (not shown) with a smooth shank passes through cylindrical bores 84 and 98 and is fastened with a captive nut (not shown) located in hex-head recess 86 in connection piece 80. In this manner, backrest 70 is pivotally connected to extension arms 72.

Stop lug 104 projects inwardly of recess 96 in extension arm 72. Abutment surface 106 on stop lug 104 limits forward rotation of backrest 70 by contacting key type lug 82 in connection piece 80 and maintains backrest 70 in the forward facing horizontal position. Similarly, abutment surface 108 limits-rotation of backrest 70 by contacting key type lug 82 in connection piece 80 and maintains backrest 70 in the rearward facing horizontal position. This arrangement permits backrest 70 to be manually flipped from the forwardly extending position shown in FIGS. 1 to 3 for use in the walker mode, to the rearwardly facing position, shown in FIGS. 4 and 5 for use in the transport chair mode.

When walker/transport chair 10 is in the transport chair configuration, the user or a care-giver flips backrest 70 to the rearward extending position as shown in FIGS. 4 and 5. The user positions himself in front of and facing away from walker/transport chair 10 and sits down on seating surface 34 with his back against backrest 70. Footrest 72 is then folded from the stowed position shown in FIGS. 2 and 3 to the deployed position shown in FIGS. 4 and 5. In this position, i.e. the transport chair mode, the user rests his heels on footrest tray 76, and can be comfortably propelled by the caregiver. (Footrest 72 has been omitted from FIG. 1 to show greater detail of crossbar 68). The forward facing seated position is not only useful when the apparatus is being propelled by a caregiver in the transport chair mode, but also permits the apparatus to be positioned close to a table, for example when eating a meal. Conventional walkers in which the user is seated in the rearward facing position are not well suited to this application because the rearward projecting handgrips and the rear wheels limit how close the walker can be placed, while the seating surface is typically positioned far forward of the handgrips.

Conventional walkers usually require a crossbar between the front leg members to strengthen the frame against collapse when the walker is bearing substantial weight, for example, when the user is seated. A front crossbar is particularly required where the front leg members are pivotally attached to the frame to permit folding, which pivotal attachment provides little resistance to outward splaying of the legs under load.

For conventional walkers, the presence of a crossbar between the front legs of the walker typically does not interfere with the user's movements, as the user is positioned behind the walker in both the walking and sitting positions. However, the front crossbar on a conventional walker interferes with its use as a transport chair. In particular, in order to assume the forward facing sitting position in the transport chair mode, a user must be able to position his heels very close to a point on the ground directly under the front edge of the seating surface. If the user is positioned too far forwards, he tends to lose balance when attempting to assume the seated position, falling backward in an uncontrolled manner onto the seating surface. This can cause the walker to upset resulting in serious injury to the user. Conventional cross-bars are usually positioned well forward of the front edge of the seating surface and accordingly tend to prevent a user from positioning his heels close to a point on the ground directly under the front edge of seating surface.

The walker/transport chair design of the present invention is configured to overcome the limitations of conventional walker frame design. First, as seen in FIG. 1 front leg members 12 are positioned at an angle closer to vertical than are most conventional walkers. This minimizes the extent to which the lower ends of front leg members 12, and consequently crossbar 68, project forward of the forward edge 90 of seating surface 34. However, this has the undesirable effect of shortening the wheelbase and lessening stability. In order to provide for a lengthened wheelbase, the front fork assemblies 48 are not secured axially inside the lower end of front legs 12, as is conventional practice in walker design. Instead, front fork assemblies 48 are secured in end fittings 40, which project forwardly from the lower end of leg members 12, effectively lengthening the wheelbase.

Another feature of the present invention that enhances its use as a transport chair is the design of crossbar 68. As best shown in FIGS. 4 and 5, cross-bar 68 attaches to front leg members 12 at their lower ends, which point is forward of the forward edge 90 of seating surface 34. In order to permit the user to more safely assume the forward-facing seated transport chair position, cross-bar 68 is rearwardly curved such that its central portion is located substantially under the forward edge 90 of seating surface 34. This curved cross-bar arrangement permits the user to place his heels close to a point on the ground directly under the front edge of seating surface, and thereby. While a curved geometry is shown in the drawings, other configurations could be used so long as the crossbar is configured such that its central portion is located substantially under or behind the forward edge 90 of seating surface 34.

Figure 9:
FIG. 9 is a front view of the cross-bar member.
Figure 10:
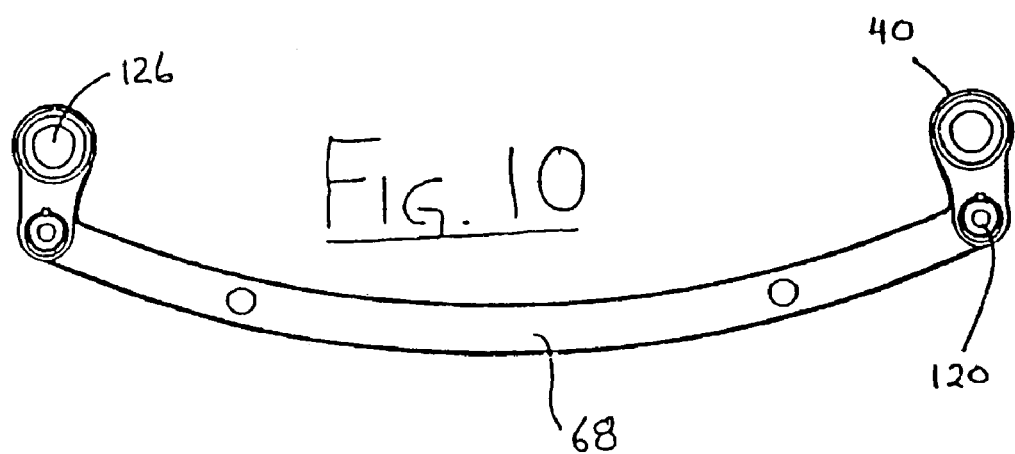
FIG. 10 is a top plan view of the cross-bar member.
Figure 11:
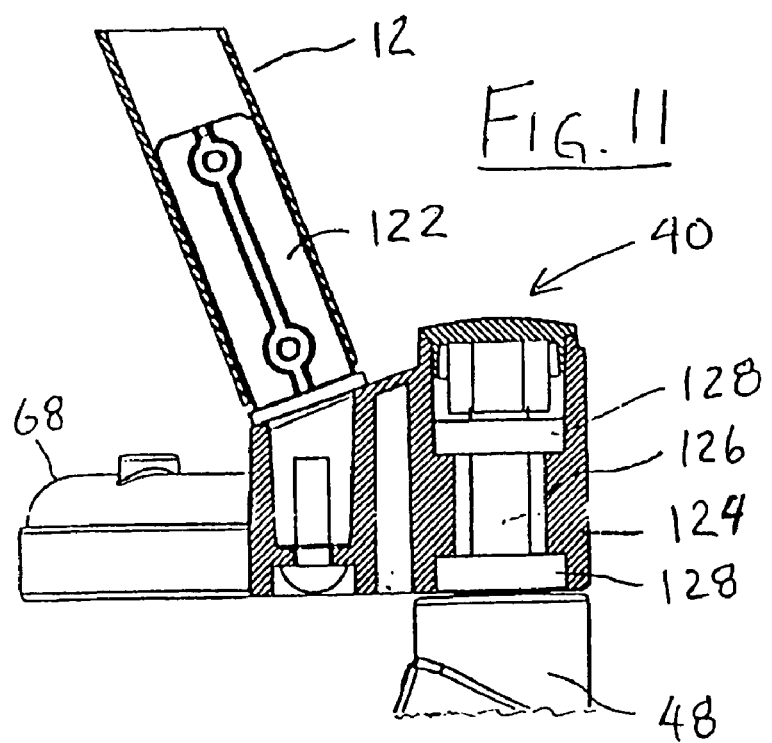
FIG. 11 is a right side view in partial section of the cross-bar member connection details.

Construction details of crossbar 68 and end fittings 40 can be seen in FIGS. 9 to 11. Crossbar 68 and end fittings 40 are unitarily molded or cast from a material of suitable strength. For example crossbar 68 can advantageously be formed of cast aluminum. Cylindrical bores 120 are provided in crossbar 68 to receive connector piece 122, which is bolted into the lower ends of forward leg member 12. Front fork shaft 124 is vertically received in bore 126 and is rotatably retained by upper and lower bearings 128 fitted in bore 126.

As noted above, the front fork assemblies of conventional walkers are typically inserted directly into the hollow ends of the leg members. The fork-mounting shaft is usually carried in a single bearing, which is press-fitted into the bottom end of the leg member. This arrangement is prone to failure. In particular, repetitive striking of the wheels into curbs and other obstacles and impact over rough road surfaces has a tendency to deform and widen the lower end of the leg members into which the bearing is pressed. This can cause the bearing, and the entire fork/wheel assembly to fall out of the bottom of the leg member. By mounting the front fork assemblies 48 to end fittings 40 fitted with two bearings, rather than directly into a single bearing in the bottom end of the leg, the ability of the fork assemblies and the lower leg mounting hardware to absorb shock, without failure is greatly improved.

The design of the walker/transport chair 10 permits the use of a novel and effective braking system. Conventional walkers use Bowden cables, which extend from the handgrip mounted brake levers to the braking wheels. Bowden cables are relatively inexpensive and because they are flexible, can be installed with excess length in a freestanding loop or bight to accommodate changes in length occasioned by the adjustment of handgrip height. However, the use of a Bowden cable arrangement has a number of disadvantages. The same freestanding loop or bight that permits handgrip height adjustability is prone to being caught or hooked on various obstructions, particularly when the walker is loaded into, or unloaded from the trunk of a car. In addition, Bowden cables must be accurately adjusted and even a slight lack of adjustment can cause unsatisfactory braking action.

The design of the present invention permits the use of an internal brake actuating mechanism. Referring to FIGS. 12 and 13, a handle housing 62 comprises right side housing shell 200 and left side housing shell 202, which are bolted at their lower ends to telescopic tube 52. The handgrip 60 is bolted between right side housing shell 200 and left side housing shell 202 at their upper ends. The brake lever 64 is retained between right side housing shell 200 and left side housing shell 202 in the manner described below.

Referring to FIG. 12, the inside face of right side housing shell 200 is shown. Raised wall 204 forms an elongated groove 206 on the inside face with a longitudinal axis that is parallel to telescopic tube 52. Semicircular bearing surfaces 208 are formed in the lower portion of the inside face.

Referring to FIGS. 14 to 16, brake actuator 210 has raised tongue portion 212, which is sized to be slidably retained in elongated groove 206 of right side housing shell 200, and cylindrical portion 214, which is sized to be slidably retained in semicircular bearing surfaces 208 of right side housing shell 200.

FIG. 17 shows the position of brake actuator 210 when it is slidably received in right side housing shell 200. Bias spring 218 is carried between retaining lug 216 formed at the upper end of brake actuator 210 and stop wall 220 formed at the upper end of groove 206 and biases brake actuator 210 in the downward direction. Brake actuator 210 has elongated aperture 215 formed through cylindrical portion 214. This elongated aperture 215 permits cylindrical portion 214 to extend down into telescopic tube 52 and allow bolts to pass through bolt holes 217 in right side housing shell 200, telescopic tube 52, elongated aperture 215, telescopic tube 52 and bolt holes 217 in left side housing shell without interfering with the vertical sliding motion of brake actuator 210. Such a through-bolting arrangement greatly improves the mechanical strength of the attachment of push handle assemblies 50 to telescopic tubes 52.

Referring to FIGS. 18 and 19, brake lever 64 comprises upper arm 220 and lower arm 222 joined at their rear extremities by ball shaped gripping projection 224. Brake lever 64 is shaped such that braking action, as more completely described below, can be effected by placing the hands on handle grips 50, inserting fingers through opening 226 and pulling up on upper arm 220 with inward gripping action. Downward pressure on lower arm 222 will move brake lever 64 downward into a locked or "parked" position, also as more completely described below. Ball shaped gripping projection 224 assists in moving brake lever in a downward direction by enabling the user to hook a thumb over the projection to apply downward force. This is particularly useful for a user with strength or mobility limitations in the hands.

Pivot pin 228 projects from the left side of brake lever 64 at its forward end and is sized to be received in slot 230 (FIG. 13) formed in the inside surface of left side housing shell 202. Brake actuating lug 232 projects from the right side of brake lever 64 and its upper surface engages downward facing abutment surface 234 formed in brake actuator 210. Camming lug 236 projects from the left side of brake lever 64. A brake-lock actuating lug 238 projects from the right side of brake lever 64 at its forward end opposite pivot pin 228.

Figure 20:
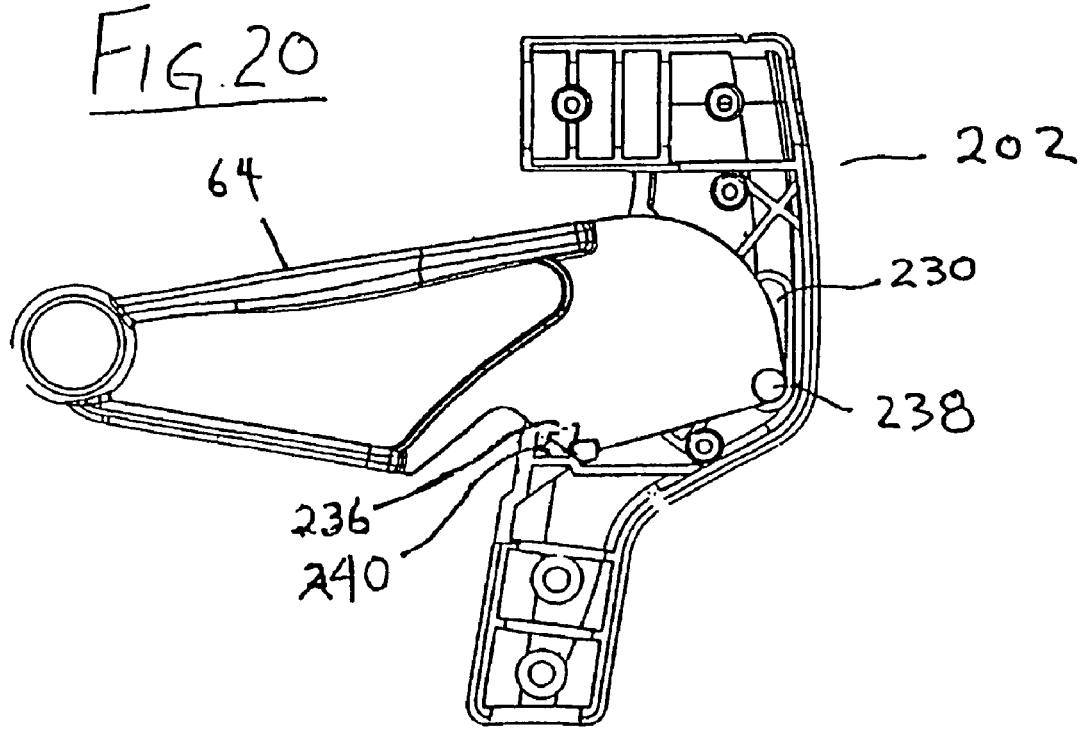
FIG. 20 is a side view of the inside of the left brake housing half showing the brake lever in the neutral position.

Referring to FIGS. 20 and 22, brake lever 64 is shown in the neutral position when no manual braking action is applied. In this position, the brake lever 64 projects rearwardly in a direction slightly below horizontal. Pivot pin 228 rests at the bottom of slot 230 in left side housing shell 202 and camming lug 236 (shown in phantom lines) rests on upward facing abutment surface 240 formed on the inside surface of left side housing shell 202. Brake lever 64 is retained in this position by the downward pressure of bias spring 218 acting on brake actuator 210, as can be seen with reference to FIG. 17.

Downward facing abutment surface 242 (shown in phantom lines) formed in brake actuator 210 abuts the upper surface of the brake-lock actuating lug 238 (shown in phantom lines) formed in brake lever 64 and the downward action of bias spring 218 on brake actuator 210 urges pivot pin 228 to the bottom of slot 230. Similarly, downward facing abutment surface 234 (shown in phantom lines) formed in brake actuator 210 abuts the upper surface of brake actuating lug 232 (shown in phantom lines) formed in brake lever 64 and the downward action of bias spring 218 on brake actuator 210 urges camming lug 236 into engagement with upward facing abutment surface 240.

Thus in the neutral position as shown in FIGS. 20 and 22, brake lever 64 rests with pivot pin 228 at the bottom of slot 230 and camming lug 236 resting on upward facing abutment surface 240. Brake actuator 210 is urged downwardly by bias spring 218 and rests with downward facing abutment surface 242 resting on brake lock actuating lug 238 and downward facing abutment surface 234 resting on brake actuating lug 232.

Referring to FIG. 23, brake lever 64 is shown in the braking position when manual braking action is applied. In this position, the brake lever 64 has been pivoted about pivot pin 228 in the bottom of slot 230 until the upper arm 220 of brake lever 64 is substantially horizontal. This pivoting action causes brake-actuating lug 232 (shown in phantom lines) to raise brake actuator 210 by engagement with downward facing abutment surface 234 (shown in phantom lines). By manually releasing brake lever 64, bias spring 218 will urge brake actuator 210 back to the neutral position shown in FIG. 13. The upward motion of brake actuator 210 between the neutral and braking positions is transmitted to rear wheel brake shoes 66 in a manner described below.

Figure 21:
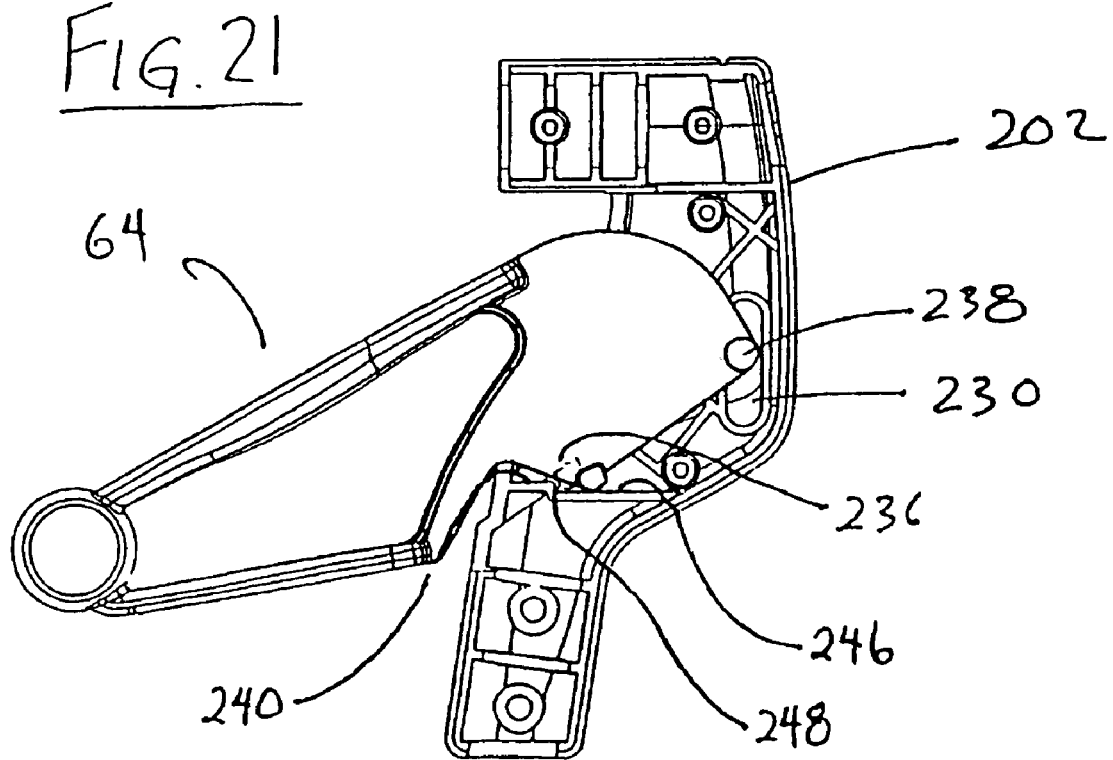
FIG. 21 is a side view of the inside of the left brake housing half showing the brake lever in the depressed brake locking position.

Referring to FIGS. 21 and 24, brake lever 64 is shown in the locked or "park" position. In this position, brake lever 64 has been pivoted down about camming lug 236 (shown in FIG. 21 in phantom lines). This pivoting motion causes pivot pin 228 to move upward in slot 230 and draws camming lug 236 forward over upward facing abutment surface 240 onto lower abutment surface 246.

As can be seen with reference to FIG. 24, this pivoting motion causes brake lock actuating lug 238 (shown in phantom lines) to raise brake actuator 210 by engagement with downward facing abutment surface 242 (shown in phantom lines). Brake lever 64 is retained in this locked or "park" position by the downward pressure of bias spring 218 acting on brake actuator 210 which urges camming lug 236 backwards into engagement with forward facing abutment surface 248. Downward bias is also provided by spring 290 (see FIG. 27). By applying manual pressure to raise brake lever 64, camming lug 236 is raised over forward facing abutment surface 248 and returns to the neutral position shown in FIG. 22. Thus, the sliding movement of camming lug 236 over forward facing abutment surface 248 provides an over-center action to lock and unlock brake lever 64. The upward motion of brake actuator 210 between the neutral and lock or "park" positions is transmitted to rear wheel brake shoes 66, as described below.

As is evident from the foregoing description, the user can apply and release a braking force to the rollator by pulling up and releasing brake lever 64, and can apply a constant braking force by pushing brake lever 64 down into the locked or "park" position.

Figure 25:
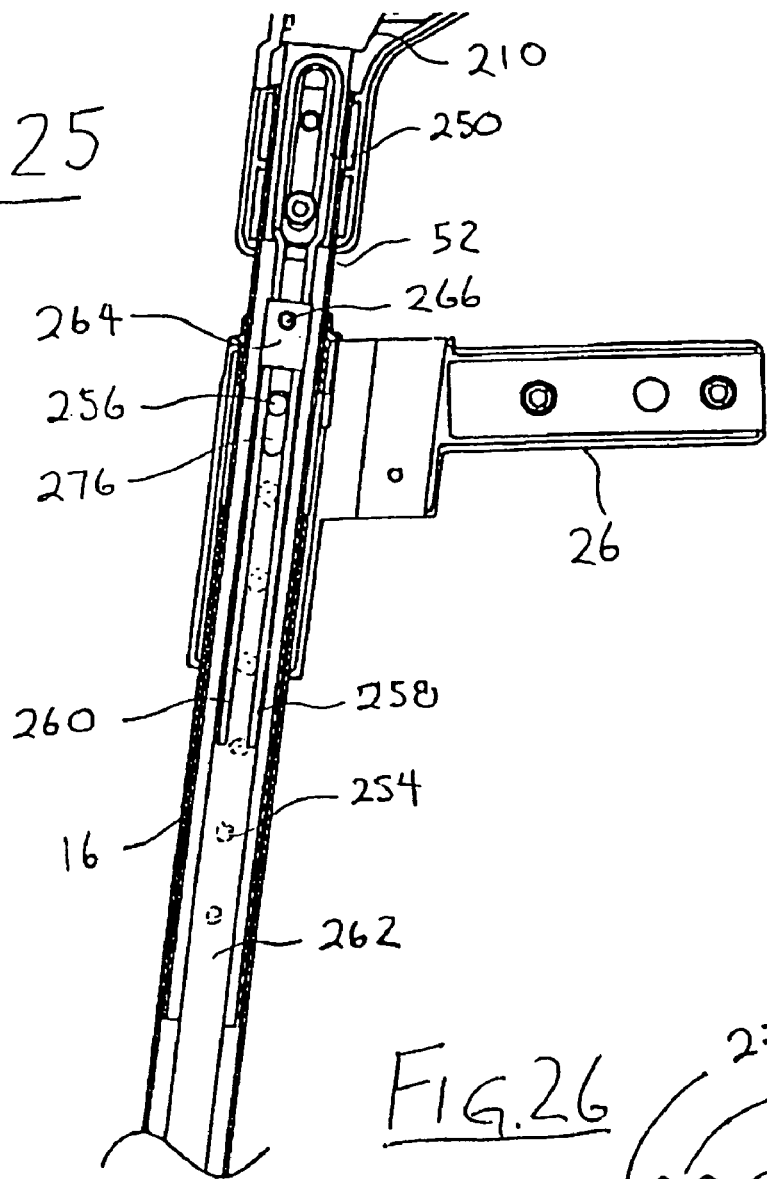
FIG. 25 is a right side view in partial section of the internal brake actuating mechanism of the present invention.

Referring now to FIG. 25, the manner in which the upward motion of brake actuator 210 is transmitted to rear wheel brake shoe 66 is shown. Brake actuator 210 is bolted in the upper end of telescopic tube 52 as described above. Telescopic tube 52 is slidably received inside rear leg member 16. Rear leg member 16 is fixedly attached to fixed rear leg bracket 26 in a manner that leaves the inside volume of rear leg member 16 open to permit telescopic tube 52 to slide therein. For example, bosses having threaded sockets can be provided on the outer surface of rear leg member 16 and corresponding keyway can be formed in fixed rear leg bracket 26 to receive such bosses. Leg 16 and bracket 26 can then be secured by bolting through an aperture in the keyway into the threaded sockets.

Telescopic tube 52 is provided with a series of evenly spaced holes 254 along a portion of its length. Fixed rear leg bracket 26 has a transverse bore 256 formed in each side, with the inner bore being internally threaded to receive the threaded end of thumb screw 54 (see FIG. 1). Handgrip assembly 50 may be fixed at the desired height by aligning a selected hole 254 in telescopic tube 52 with bore 256 in bracket 26. Thumb screw 54 is inserted into the outer bore 256 of bracket 26, through the selected hole 254 in telescopic tube 52, and is screwed into the threaded inner bore 256 on the opposite side of bracket 26.

This arrangement provides for a secure manner of adjustably attaching handgrip assembly 50 to the fixed rear leg bracket 26 of the walker. The use of thumbscrew 54, which passes entirely through telescopic tube 52 and is threaded into the opposite side of bracket 26, distributes the load applied by the user on handgrip assemblies 50 evenly across bracket 26. This is a far more durable means of attachment than that one which merely secures the telescopic tube by a thumbscrew, which passes through one wall of the bracket and squeezes against the outer surface of the telescopic tube. A solid attachment between the telescopic tube 52 and bracket 26 is extremely important not only for reasons of durability and safety, but also because of the sense of security imparted to the user. Users are far less willing to accept a walker if the handgrip assemblies feel loose or flimsily mounted. While the through-bolt arrangement of thumbscrew 54 does offer enhanced durability, it does require a special arrangement to permit brake actuation internally within telescopic tube 52.

Referring to FIG. 25, a brake wire 250 is formed in an inverted "U" shape with a bight at an upper end thereof being retained in groove 252 formed in the cylindrical portion 214 of actuator 210. Downwardly extending legs 258 and 260 of the brake wire 250, which form a gap therebetween, are attached to the brake rod 262 by means of a clamp 264. The brake rod 262 is an elongated "U" shaped channel member.

Figure 26:
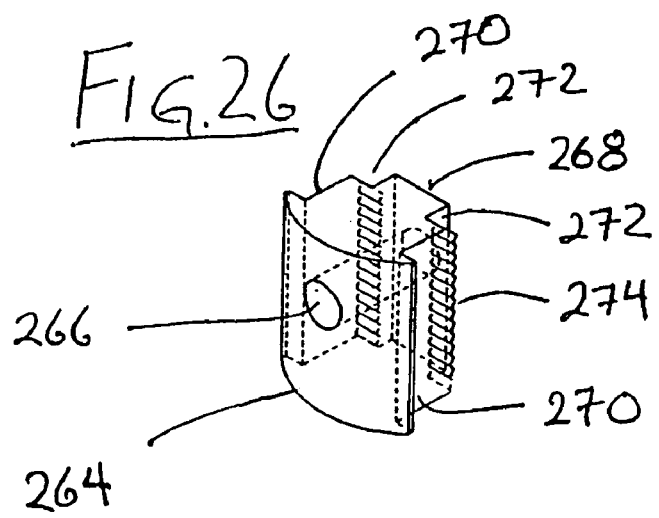
FIG. 26 is a perspective view of the brake wire clamp.

Referring to FIG. 26, clamp 264 has back surface 268 and side surfaces 270, which are sized to be closely received in the "U" channel of brake rod 262. Recesses 272 are provided to accommodate downwardly extending legs 258 and 260 of brake wire 250, and teeth 274 are formed in recesses 272 to grip brake wire 250. The clamp 264 is drawn tight against the upper end of the brake rod 262 by means of an Allen screw 266, whereby the teeth 274 trap and secure the brake wire 250 against the brake rod 262. The Allen screw 266 is axially aligned with the first hole 254 in the telescopic tube 52 above bracket 26 permitting a wrench or key to be inserted therethrough for the purpose of loosening or tightening clamp 264. The brake wire 250 can advantageously be formed of wound steel piano wire, e.g. 0.09 inch diameter, as the ridged surface thereof can be securely gripped by the teeth 274.

Elongated slot 276 is formed in the center web of brake rod 262. Thumbscrew 54, which is threaded into transverse bore 256, passes through slot 276. Slot 276 is sized as to permit brake rod 262 to be displaced longitudinally by the upward and downward movement of brake actuator 210 without contacting thumbscrew 54.

In order to adjust the height of handgrip assemblies 50, a key or wrench is inserted through hole 254 above bracket 26 and Allen screw 266 is loosened to permit relative longitudinal movement between the brake wire 250 and the brake rod 262. The thumbscrew 54 is then unscrewed and withdrawn from the transverse bore 256. The telescopic tube 52 is then raised or lowered until the desired hole 254 is axially aligned with the transverse bore 256 and the thumbscrew 54 is reinserted and tightened to secure telescopic tube 52 in bracket 26. Finally, Allen screw 266 is tightened to secure the brake wire 250 to the brake rod 262.

Figure 27:
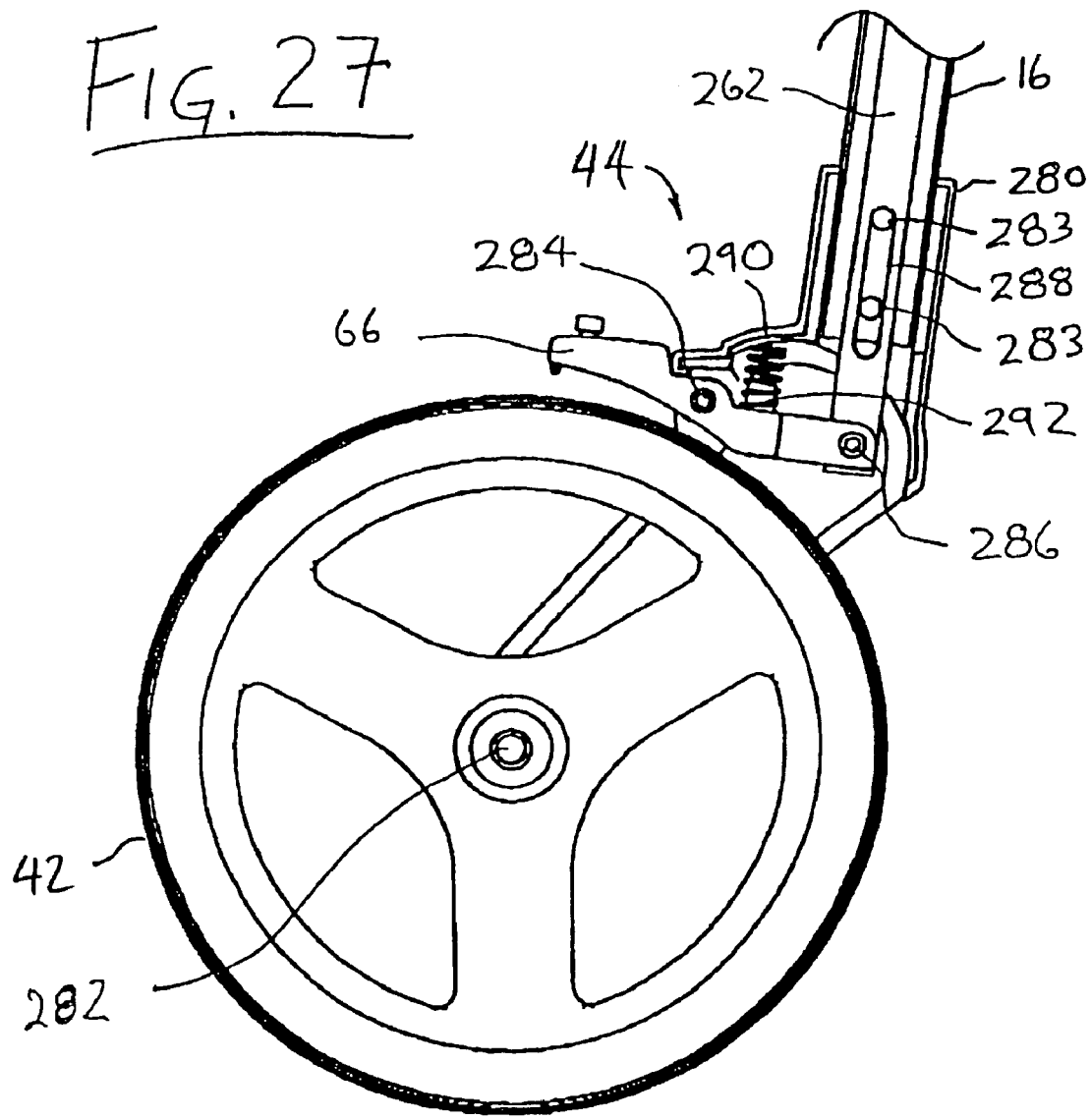
FIG. 27 is a right side view, in partial section showing the brake shoe connection details.

Referring to FIG. 27, rear fork assembly 44 comprises inner and outer fork housings 280 (only one of which is shown in FIG. 20) between which the rear wheel 42 is mounted for rotation about the axle 282. Rear fork assembly 44 is attached to rear leg member 16 by means of through-bolts (not shown), which pass through holes 283 in the fork housings and rear leg member 16. Brake shoe 66 is pivotally mounted on shaft 284, which is transversely secured between fork housings 280. Brake rod 262 is connected at its bottom end to the brake shoe 66 at pivot point 286. Elongated slot 288 is provided in the centre web of brake rod 262 to permit the through-bolts to pass therethrough and is sized to permit brake rod 262 to be displaced longitudinally by the upward and downward movement of brake actuator 210 without contacting the through-bolts. Spring 290 is retained between lug 292 and housing 280 and biases brake shoe out of engagement with rear wheel 42.

Figure 28:
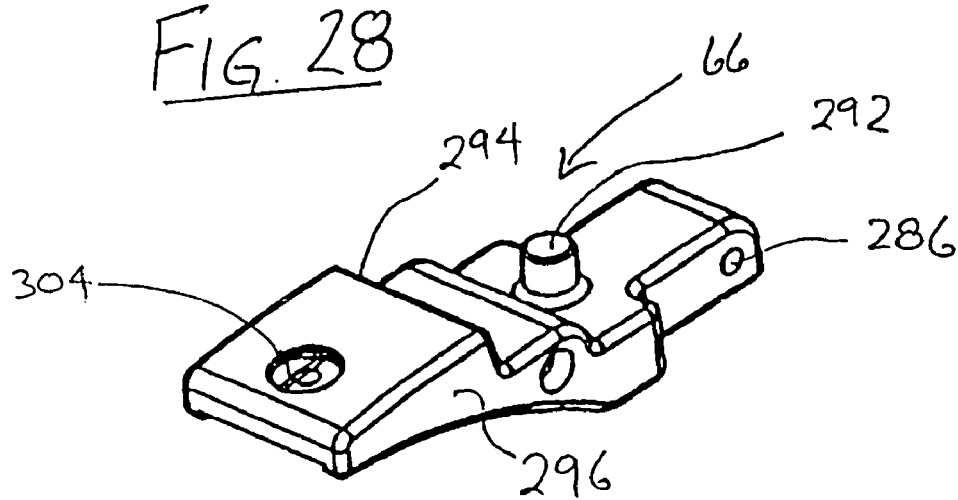
FIG. 28 is a perspective view of the brake shoe.
Figure 29:
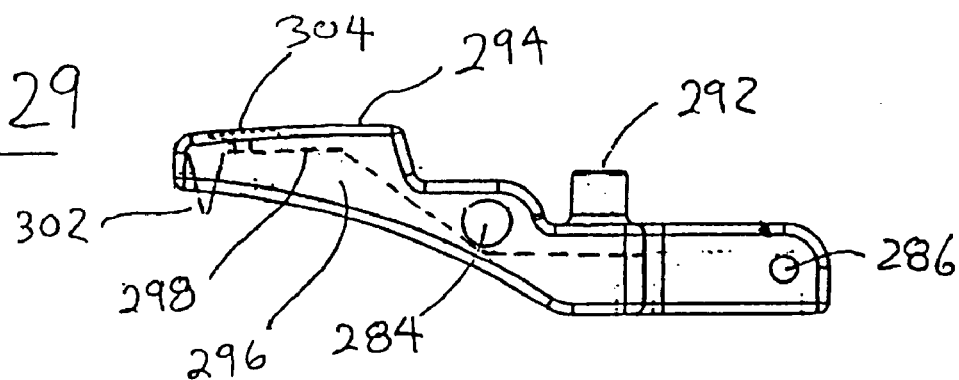
FIG. 29 is a side view of the brake shoe showing the position of the friction member.
Figure 30:
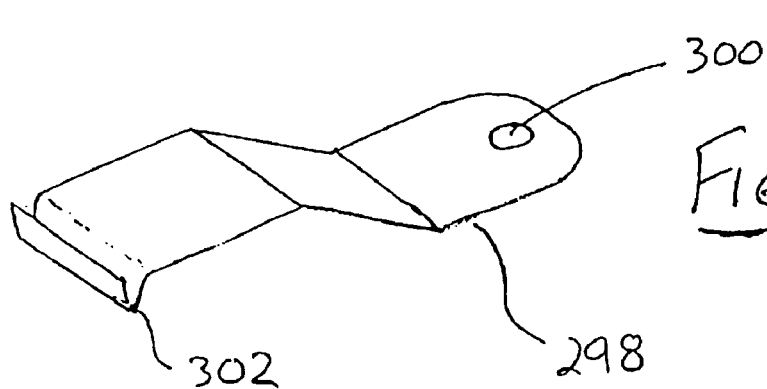
FIG. 30 is a perspective view of the friction member.
Figure 31:
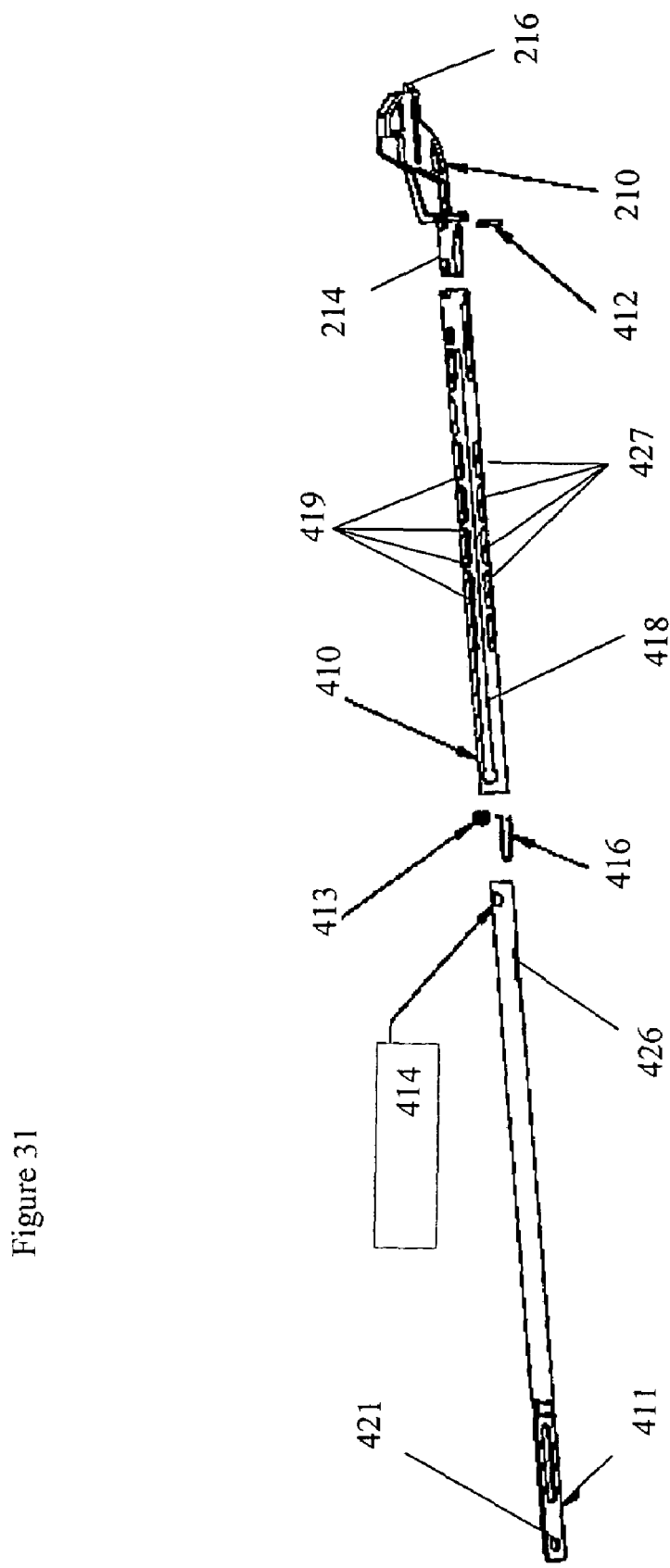
FIG. 31 is an exploded side view of a second embodiment of the internal brake actuating mechanism.
Figure 32:
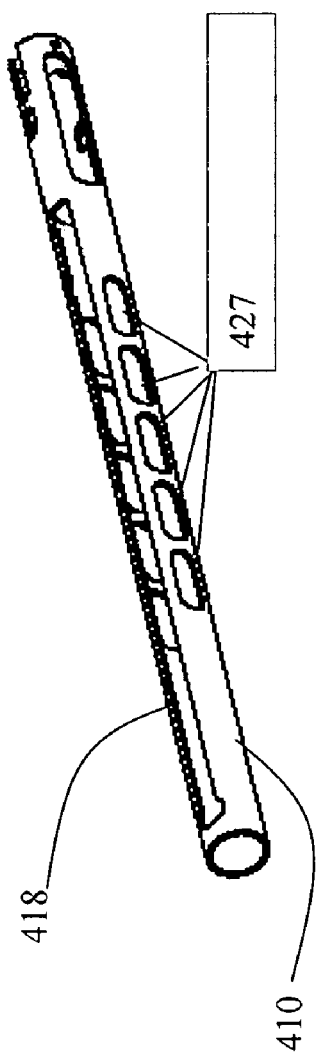
FIG. 32 is an isometric view of the upper brake leg of FIG. 31.
Figure 33:
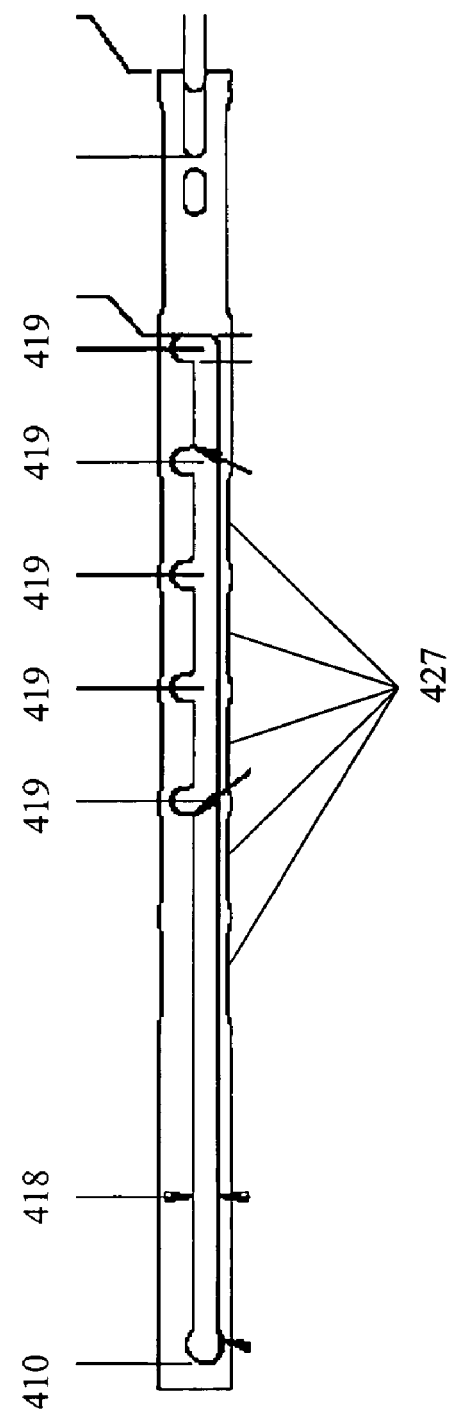
FIG. 33 is a side view of the upper brake leg of FIG. 32.
Figure 34:
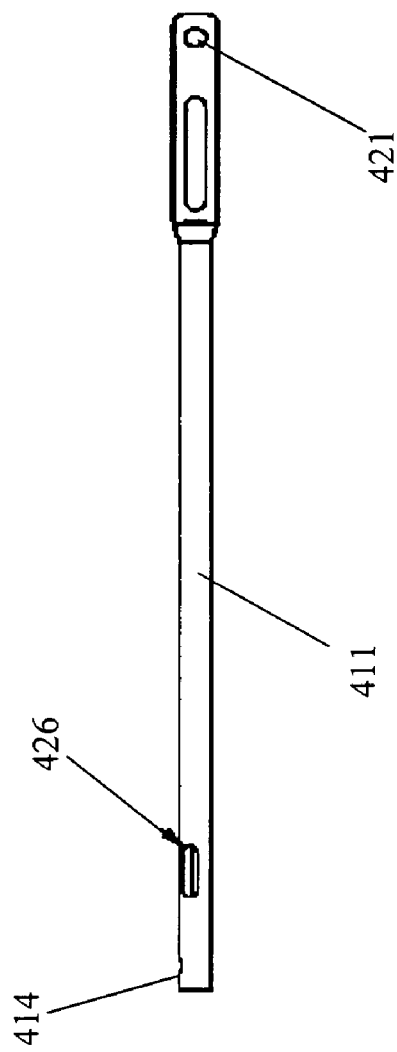
FIG. 34 is a side view of the lower brake rod of FIG. 31.
Figure 35:
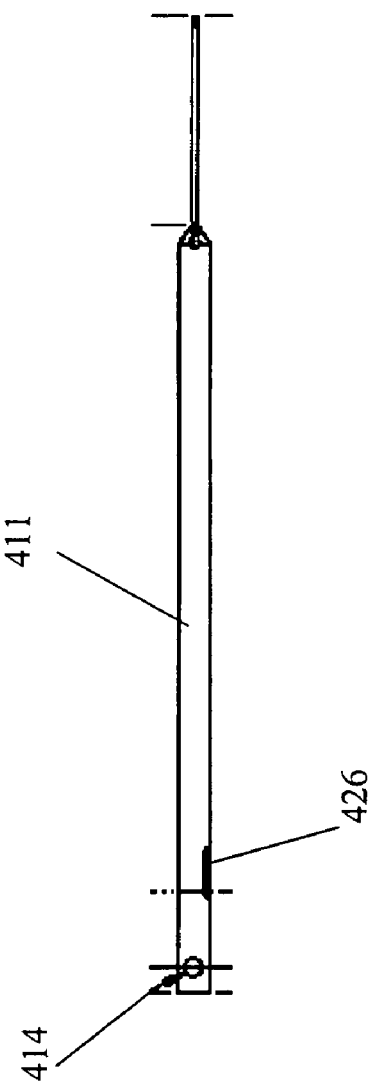
FIG. 35 is a side view of the lower brake rod of FIG. 34.
Figure 36:
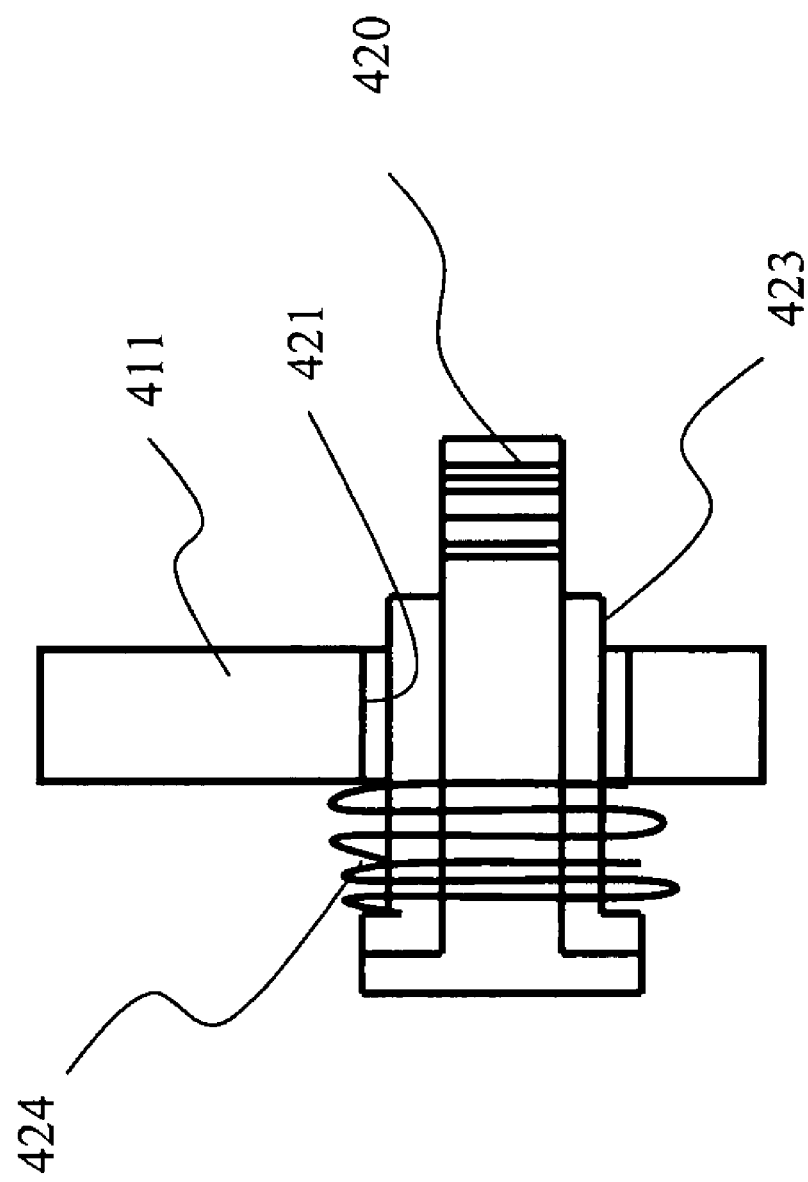
FIG. 36 is cross sectional view of the connection for the lower end of the lower brake rod of FIGS. 34 and 35.

Referring to FIGS. 28 to 30, the details of brake shoe 66 can be more readily seen. Brake shoe 66 has a horizontally disposed upper surface 294 and vertical sidewalls 296, which together bound a downwardly open cavity. Friction member 294 is carried within said cavity and is attached thereto at point 300. Friction member 294 has downwardly protruding tang 302 at its rearward end. Adjusting screw 304 is threaded through the upper surface 294 of brake shoe 66 and contacts the upper surface of friction member 294. The extent to which tang 302 protrudes below brake shoe 66 can be varied by turning adjusting screw 304 in or out. This adjustability permits fine-tuning of the braking action and compensates for tire wear.

When brake rod 262 is moved upwardly by the operation of brake lever 64, brake shoe 66 is caused to pivot about shaft 284 forcing tang 302 downward into frictional engagement with rear wheel 42. When brake lever 64 is released and returns to its neutral position, brake rod 262 moves downwardly and brake shoe 66 pivots out of frictional engagement with rear wheel 42. In this manner, braking action is transmitted from the brake lever 64 to the brake shoe 66 internally of telescopic tube 52 and rear leg member 16.

An alternative embodiment for a height adjustable brake according to the present invention is illustrated in FIGS. 31 to 36, and includes an upper brake leg 410 slideably receiving a lower brake rod 411. The cylindrical portion 214 of brake actuator 210 is fixed to an upper end of the upper brake leg 410 by fastener 412. The lower end of the upper brake leg 410 receives the upper end of the lower brake rod 411. A lock button 413 is spring biased outwardly through a hole 414 in the upper end of the lower brake rod 411 by a spring 416 for adjustably connecting the lower brake rod 411 to the upper brake leg 410. An elongated groove 418 extends through the wall of the upper brake leg from the lower end to the upper end thereof for slideably receiving the lock button 413. Channels 419 extend perpendicularly from the groove 418 providing several resting places for the lock button 413 defining a plurality of positions corresponding to different predetermined heights of the handgrip assemblies 50. The lower end of the lower brake rod 411 is connected to the rear fork assemblies 44 by a bolt 420, which extends through an opening 421. A spacer bushing 423 surrounds the bolt 420 providing a smooth bearing surface enabling the lower brake rod 411 to rotate slightly about a longitudinal axis thereof during height adjustment. The opening 421 has a diameter slightly larger than an outer diameter of the spacer bushing 423 to facilitate relative rotation. The slight twisting of the lower brake rod 411 enables the lock button 413 to disengage from one of the channels 419 during adjustment. A coil spring 424, surrounding the spacer bushing 423, spring biases the lower brake rod 411 to the normal use position, i.e. biases the lock button 413 back into one of the channels 419.

During height adjustment, as the lock button 413 engages one of the channels 419, elongated slots 426 in opposite sides of the lower brake rod 411, forming gaps therein, become aligned with one of a series of elongated apertures 427 in the upper brake leg 410 for receiving the thumb screw 54 or some other locking bolt, rod or pin. Accordingly, the thumbscrew 54 extends all the way through the fixed rear leg bracket 26, the telescopic tube 52, the lower brake rod 411 and the upper brake leg 410 providing a secure locking feature between the fixed rear leg bracket 26 and the telescopic tube 52, while providing reciprocal movement of the lower brake rod 411 and the upper brake leg 410, enabling actuation the brake levers 64. Moreover, the thumbscrew 52 ensures that the upper brake leg 410 does not rotate relative to the lower brake rod 411, thereby disengaging the lock button 414 from the selected channel 419.

While the present invention has been described with reference to the embodiments disclosed in the Figures, it will be understood that variations and modifications may be made without necessarily departing from the scope of the invention. Accordingly, the scope of the invention is to be determined in accordance with the claims appended hereto.

We claim:

1. A height-adjustable, manually-actuated brake device for use with a wheel mounted on a height-adjustable frame, which includes a lower telescopic member, an upper telescopic member, and a locking pin for extending all the way through both the upper and lower telescopic members to the opposite sides thereof, comprising:
    a brake mounted on the lower telescopic member;
    a manually-engageable brake actuator for actuating the brake;
    an upper leg extending from the brake actuator through the upper telescopic member, the upper leg including a gap for receiving the locking pin, which extends therethrough;
    a lower rod adjustably connected to the upper leg and extending through the lower telescopic member, the lower rod including a slot for receiving the locking pin, which extends therethrough; and
    an adjustable connector for locking the upper leg and lower rod together at any one of a plurality of positions;
    wherein the adjustable connector comprises a clamp connected to the lower rod for securing the upper leg therebetween.

2. The device according to claim 1, wherein the upper leg is comprised of a wire, which is trapped between said clamp and said lower rod.

3. The device according to claim 2, wherein the wire is wrapped around said brake actuator, whereby both ends of said wire are trapped between said clamp and said lower rod.

4. The device according to claim 3, wherein the lower rod includes a channel member for receiving said clamp.

5. The device according to claim 3, wherein said clamp includes teeth for engaging said wire.

6. A height-adjustable, manually-actuated brake device for use with a wheel mounted on a height-adjustable frame, which includes a lower telescopic member, an upper telescopic member, and a locking pin for extending all the way through both the upper and lower telescopic members to the opposite sides thereof, comprising:
    a brake mounted on the lower telescopic member;
    a manually-engageable brake actuator for actuating the brake;
    an upper leg extending from the brake actuator through the upper telescopic member, the upper leg including a gap for receiving the locking ping which extends therethrough;
    a lower rod adjustably connected to the upper leg and extending through the lower telescopic member, the lower rod including a slot for receiving the locking pin, which extends therethrough; and
    an adjustable connector for locking the upper leg and lower rod together at any one of a plurality of positions;
    wherein the upper leg is comprised of a tubular member capable of telescoping with said lower rod;
    wherein the connector comprises a lock button extending from the lower rod, and perpendicular channels in the tubular member for receiving the lock button, each perpendicular channel corresponding to one of the plurality of locked positions.

7. The device according to claim 6, wherein the tubular member of the upper leg includes an elongated groove for slideably receiving the lock button therein during height adjustment, and wherein the perpendicular channels extend from the elongated groove for receiving the lock button.

8. The device according to claim 6, wherein the gap in the tubular member includes a plurality of elongated apertures, each one corresponding to one of the plurality of positions, for aligning with the slot and receiving the locking pin therethrough, wherein each aperture prevents rotation of the upper leg, while enabling limited reciprocal movement for actuating the brake lever.

9. The device according to claim 7, wherein the lower rod is pivotally connected to the brake lever providing rotation about a longitudinal axis thereof facilitating relative adjustment of the upper leg and the lower rod.

10. The device according to claim 9, wherein the lower rod is spring biased to rotate the lock button into one of the channels.

11. A mobility aiding device comprising:
    a frame including front and rear support members, the rear support members having upper and lower telescoping members;
    a locking pin for extending all the way through the upper and lower telescoping members to the opposite sides thereof for locking the relative position thereof;
    front wheels mounted on the front support members;
    rear wheels mounted on the rear support members;

a moveable brake mounted on the frame for hindering the rotation of one of the front or rear wheels;

a manually-engageable brake actuator for actuating the brake;

an upper leg extending from the brake actuator through the upper telescopic member, the upper leg including a gap for receiving the locking pin, which extends therethrough;

a lower rod adjustably connected to the upper leg and extending through the lower telescopic member, the lower rod including a slot for receiving the locking pin, which extends therethrough; and an adjustable connector for locking the upper leg and lower rod together at any one of a plurality of positions; wherein the adjustable connector comprises a clamp connected to the lower rod for securing the upper leg therebetween.

12. The device according to claim 11, wherein the upper leg is comprised of a wire, which is trapped between said clamp and said lower rod.

13. The device according to claim 12, wherein the wire is wrapped around said brake actuator, whereby both ends of said wire are trapped between said clamp and said lower rod.

14. A mobility aiding device comprising:

a frame including front and rear support members, the rear support members having upper and lower telescoping members;

a locking pin for extending all the way through the upper and lower telescoping members to the opposite sides thereof for locking the relative position thereof;

front wheels mounted on the front support members;

rear wheels mounted on the rear support members;

a moveable brake mounted on the frame for hindering the rotation of one of the front or rear wheels;

a manually-engageable brake actuator for actuating the brake;

an upper leg extending from the brake actuator through the upper telescopic member, the upper leg including a gap for receiving the locking pin, which extends therethrough;

a lower rod adjustable connected to the upper leg and extending through the lower telescopic member, the lower rod including a slot for receiving the locking pin, which extends therethrough; and an adjustable connector for locking the upper leg and lower rod together at any one of a plurality of positions;

wherein the upper leg is comprised of a tubular member capable of telescoping with said lower rod;

wherein the connector comprises a lock button extending from the lower rod, and perpendicular channels in the tubular member for receiving the lock button during normal use, each perpendicular channel corresponding to one of the plurality of positions.

15. The device according to claim 14, wherein the tubular member of the upper leg includes an elongated groove for slideably receiving the lock button therein during height adjustment, and wherein the perpendicular channels extend from the elongated groove for receiving the lock button during normal use.

16. The device according to claim 14, wherein the gap in the tubular member includes a plurality of elongated apertures, each one corresponding to one of the plurality of positions, for aligning with the slot and receiving the locking pin therethrough, wherein each aperture prevents rotation of the upper leg, while enabling limited reciprocal movement for actuating the brake lever.

17. The device according to claim 15, wherein the lower rod is pivotally connected to the brake providing rotation about a longitudinal axis thereof facilitating relative adjustment of the upper leg and the lower rod.

18. The device according to claim 17, wherein the lower rod is spring biased to rotate the lock button into one of the channels.

* * * * *